United States Patent
Smith et al.

(10) Patent No.: US 9,822,948 B2
(45) Date of Patent: Nov. 21, 2017

(54) SOLID STATE ILLUMINATION DEVICES INCLUDING SPATIALLY-EXTENDED LIGHT SOURCES AND REFLECTORS

(71) Applicant: Quarkstar LLC, Las Vegas, NV (US)

(72) Inventors: George E. Smith, Sunnyvale, CA (US); Robert C. Gardner, Atherton, CA (US); Roland H. Haitz, Portola Valley, CA (US); Louis Lerman, Las Vegas, NV (US)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 14/428,147

(22) PCT Filed: Sep. 12, 2013

(86) PCT No.: PCT/US2013/059525
§ 371 (c)(1),
(2) Date: Mar. 13, 2015

(87) PCT Pub. No.: WO2014/043393
PCT Pub. Date: Mar. 20, 2014

(65) Prior Publication Data
US 2015/0241024 A1    Aug. 27, 2015

Related U.S. Application Data

(60) Provisional application No. 61/700,827, filed on Sep. 13, 2012, provisional application No. 61/700,732, (Continued)

(51) Int. Cl.
*F21V 7/07* (2006.01)
*F21V 7/06* (2006.01)
(Continued)

(52) U.S. Cl.
CPC ............... *F21V 7/06* (2013.01); *F21K 9/233* (2016.08); *F21S 8/033* (2013.01); *F21S 8/04* (2013.01);
(Continued)

(58) Field of Classification Search
CPC . F21V 7/06; F21V 7/0016; F21V 7/04; F21K 9/137; F21K 9/233; F21S 8/033;
(Continued)

(56) References Cited

U.S. PATENT DOCUMENTS 5,001,609 A    3/1991  Gardner
5,335,152 A    8/1994  Winston
(Continued)

OTHER PUBLICATIONS

U.S. Appl. No. 13/792,285.*
(Continued)

*Primary Examiner* — Elmito Breval
*Assistant Examiner* — Hana Featherly
(74) *Attorney, Agent, or Firm* — Fish & Richardson P.C.

(57) ABSTRACT

A luminaire module delivers light with a beam angle of α. The luminaire module includes a light emitting module and a reflector positioned symmetrically about an axis. Light produced by the light emitting module exits the light emitting module from one or more spatially-extended light emitting portions. The light emitting portion(s) is (are) fully contained within a spatially extended notional design envelope which is used to guide the design of reflector and its corresponding reflective surface, such that when any light exiting the light emitting portions through the design envelope strikes the reflective surface of the reflector, the light does not return to the source and escapes from the luminaire module within a beam angle α, with no more than a single reflection from a reflector.

11 Claims, 19 Drawing Sheets

Related U.S. Application Data filed on Sep. 13, 2012, provisional application No. 61/762,690, filed on Feb. 8, 2013.

(51) Int. Cl.

| | | |
|---|---|---|
| *F21S 8/00* | (2006.01) | |
| *F21S 8/04* | (2006.01) | |
| *F21V 7/00* | (2006.01) | |
| *F21V 7/04* | (2006.01) | |
| *F21K 9/233* | (2016.01) | |
| *F21V 8/00* | (2006.01) | |
| *F21Y 115/10* | (2016.01) | |
| *F21Y 107/40* | (2016.01) | |
| *F21Y 113/13* | (2016.01) | |

(52) U.S. Cl.
CPC .............. *F21V 7/0016* (2013.01); *F21V 7/04* (2013.01); *F21Y 2107/40* (2016.08); *F21Y 2113/13* (2016.08); *F21Y 2115/10* (2016.08); *G02B 6/001* (2013.01)

(58) Field of Classification Search
CPC ........ F21S 8/04; G02B 6/001; F21Y 2115/10; F21Y 2107/40; F21Y 2113/13
USPC .................................................... 362/296.07
See application file for complete search history.

(56) References Cited

U.S. PATENT DOCUMENTS

| | | |
|---|---|---|
| 5,727,108 A | 3/1998 | Hed |
| 6,095,655 A | 8/2000 | Bigliati |
| 6,527,411 B1 | 3/2003 | Sayers |
| 6,854,865 B2* | 2/2005 | Probst .................... F21L 4/027 362/202 |
| 2005/0243570 A1 | 11/2005 | Chaves |
| 2006/0152931 A1 | 7/2006 | Holman |
| 2010/0172120 A1 | 7/2010 | Wegh et al. |
| 2010/0263723 A1 | 10/2010 | Allen et al. |
| 2011/0176091 A1 | 7/2011 | Boonekamp et al. |
| 2012/0039073 A1 | 2/2012 | Tong |
| 2012/0112661 A1 | 5/2012 | Van De Ven |
| 2013/0021776 A1 | 1/2013 | Veerasamy et al. |

OTHER PUBLICATIONS

Notification of Transmittal of the International Search Report and the Written Opinion of the International Searching Authority, International Application No. PCT/US2013/059525, mailed Feb. 19, 2014, 9 pages.

* cited by examiner

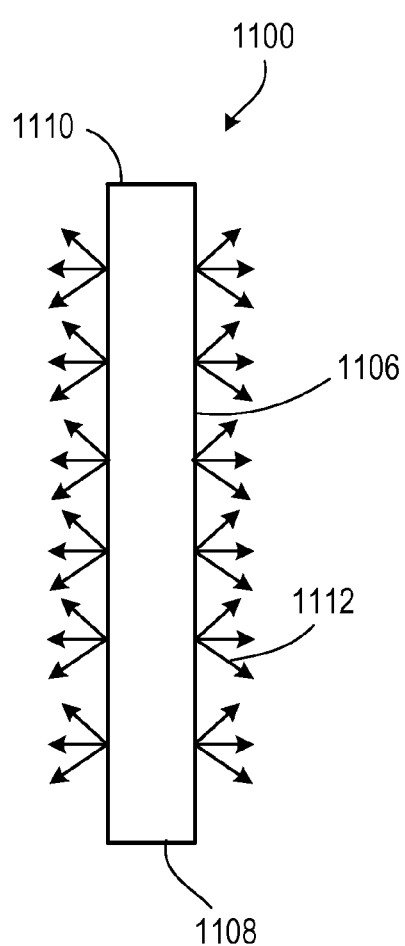
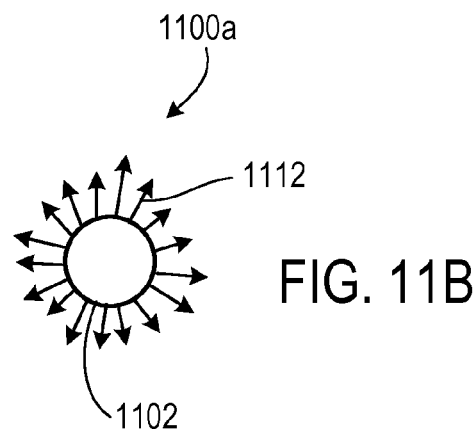
FIG. 11B
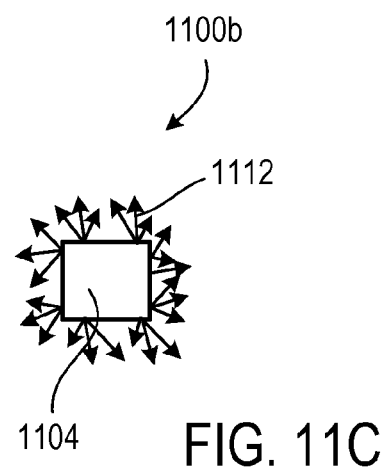
FIG. 11C
FIG. 11A

SOLID STATE ILLUMINATION DEVICES INCLUDING SPATIALLY-EXTENDED LIGHT SOURCES AND REFLECTORS

CROSS-REFERENCE TO RELATED APPLICATIONS

This application is a U.S. National Stage of PCT/US2013/059525 filed on Sep. 12, 2013, which claims benefit of the following provisional applications: Provisional Application No. 61/700,732, filed on Sep. 13, 2012; Provisional Application No. 61/700,827, filed on Sep. 13, 2012; and Provisional Application No. 61/762,690, filed on Feb. 8, 2013. The entire contents of each of these priority applications are hereby incorporated by reference.

TECHNICAL FIELD

This invention relates to luminaries, and more particularly to configurations of solid-state lighting (SSL) luminaires.

BACKGROUND

Light sources are used in a variety of applications, such as providing general illumination and providing light for electronic displays. Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and solid state light sources such as light-emitting diodes (LEDs).

SUMMARY

Solid-state lighting (SSL) products based on different LED package configurations and configured to provide various color temperature characteristics and lighting applications have become popular in modern luminaire designs. Many SSL luminaires are manufactured by assembling one or more standard components, such as mounts, light emitting elements, and optical components such as diffusers, which may be available from different suppliers. Suppliers provide components for a range of power levels and different package configurations. Often, however, auxiliary optical components, such as auxiliary reflectors, are used to make a luminaire that can produce desirable illumination properties including desired flux distributions and flux levels, for example. Since control of the emitted flux as well as thermal considerations are important to luminaire efficiency, it is desirable to have versatile optical designs that can be tailored to specific end targets.

This patent document describes, among other things, luminaire modules that include a light emitting module and a reflector. The light emitting module is spatially-extended (or, simply "extended") in at least one dimension. The size and curvature of the reflector is based on a flexible optical design related to the dimensions of the light emitting module, and can be tailored to meet the requirements of various illumination applications.

Various aspects of the invention are summarized as follows:

In general, in a first aspect, the invention features apparatus that include a light-emitting module having at least one light-emitting element and a light-emitting portion that is extended spatially in at least a first direction in cross-section, and a mirror having a reflective surface which, in cross-section, includes a first portion and a second portion extending from opposing sides of the light-emitting module in the first direction and in a second direction orthogonal to the first direction, the reflective surface being positioned to receive light from the light-emitting module and configured so that the mirror and light-emitting module provide light having a light distribution pattern which, in cross-section, includes an angular range extending from an angle $\alpha$ to $-\alpha$ about an axis parallel to the first direction. In cross-section, the light emitting portion is enclosed within a notional envelope (e.g., a polygonal envelope) and the first and second portions of the reflective surface each include a plurality of segments, each segment in the respective portions having a curvature corresponding to a different mathematical formula relative to another segment in that portion based on the notional envelope. The apparatus is a luminaire.

Embodiments of the apparatus can have one or more of the following features. For example, the curvature of each segment is such that light from the light-emitting module incident on the reflective surface exits the luminaire after a single reflection from the reflective surface. In cross-section, the first and second portions can be concave. In cross-section, a slope of the reflective surface can be continuous across the segments of the first and second portions, respectively. The first and second portions can each include a first segment closest to the light-emitting module, wherein, in cross-section, the first segments have a constant radius of curvature. The radius of curvature can correspond to a length of the notional polygonal envelope in the first direction. The first and second portions each include a second segment adjacent the respective first segments, wherein a normal to the reflective surface at the point where the first and second segments meet intersects the axis at the angle $\alpha$ or $-\alpha$.

In some embodiments, the first portion of the reflective surface extends to a point coinciding with the normal to the second portion of the reflective surface where the first and second segments of the second portion meet, and the second portion of the reflective surface extends to a point coinciding with the normal to the first portion of the reflective surface where the first and second segments of the first portion meet. The second segments can have a parabolic shape in cross-section. In cross-section, the light-emitting portion can include a first side facing the first portion of the reflective surface and a second side facing the second portion of the reflective surface, the first side of the light-emitting module extending in the first direction to a first point that coincides with a focus of the parabola of the second segment of the first portion, and the second side of the light-emitting module extending in the first direction to a second point that coincides with a focus of the parabola of the second segment of the second portion.

The first and second portions can each include a third segment having, in cross-section, a parabolic shape differing from the parabolic shape of the second segments, wherein the second point coincides with a focus of the parabola of the third segment of the first portion and the first point coincides with a focus of the parabola of the third segment of the second portion.

In certain embodiments, the first and second portions each include a first segment closest to the light-emitting module, wherein, in cross-section, the first segments are involute segments.

The light-emitting portion may also spatially extend in the second direction.

The notional envelope can be a polygon. For example, the notional envelope can have a rectangular shape. In some embodiments, the notional envelope has six or more sides. In some embodiments, the notional envelope includes a curved portion (e.g., a circular portion).

The light-emitting portion can include an array of light-emitting elements extending in the first direction. The array of light-emitting elements can extend in the second direction. The light emitting-elements can be light emitting diodes (e.g., white light emitting diodes). In some embodiments, the light emitting portions include at least two light-emitting diodes facing in different directions.

In some embodiments, the light emitting module has a semicircular cross-section.

The light-emitting module can include a light-emitting diode and a wavelength conversion material positioned remote from the light-emitting diode, the wavelength conversion material spatially extending in the first direction.

The light-emitting module can include a light guide extending from a first end to a second end along the first direction, the light guide being positioned to receive light from the at least one light-emitting element at the first end and guide a portion of the received light towards the second end, the light guide being further configured to emit at least some of the light from opposing surfaces of the light guide that extend between the first and second ends. A first of the opposing surfaces can face the first portion of the mirror and the second of the opposing surfaces faces the second portion of the mirror. The light-emitting module can further include one or more optical couplers arranged to direct light from the one or more light-emitting elements to the first end of the light guide. The mirror can define an aperture through light exits the luminaire, and the light-emitting elements face towards the aperture. The mirror can define an aperture through which light exits the luminaire, and the light-emitting elements face away from the aperture.

The reflective surface may be rotationally symmetric about the axis (e.g., continuously rotationally symmetric or symmetric through discrete rotations, such as 90° rotations).

The reflective surface may have translational symmetry in a direction mutually orthogonal to the first and second directions.

In some embodiments, the reflective surface is composed of two intersecting, orthogonal troughs.

The apparatus may include a base structure connected to light-emitting module, the base structure comprising an electrical connection for the at least one light-emitting element.

Among other advantages, embodiments of the apparatus may provide efficient delivery of light from a spatially-extended light source into a range of angles. In some embodiments, the apparatus is constructed to deliver light over a specified angular range, which can be chosen based on the specific needs of the lighting application. The apparatus may have smaller dimensions relative to other types of luminaires, and may require fewer materials to construct and/or may be used in spatially constrained environments. In some embodiments, the apparatus are compatible with existing electrical and structural connectors, and may be used to replace other types of luminaires. The apparatus can deliver light into a desired angular range efficiently, such that substantially all of the generated light that directed into the range is done so with no more than a single reflection from the reflector, and minimal light (e.g., none) is directed back to the light emitting module where it may be absorbed. Accordingly, luminaires embodying the disclosed principles may be more energy efficient and/or cheaper to operate than conventional luminaires.

The details of one or more embodiments are set forth in the accompanying drawings and the description below. Other features, objects, and advantages of the invention will be apparent from the description and drawings, and from the claims.

DESCRIPTION OF DRAWINGS

FIGS. 11A-C show embodiments of an extended light source.

Like reference symbols in the various drawings indicate like elements.

DETAILED DESCRIPTION

Figure 1A:
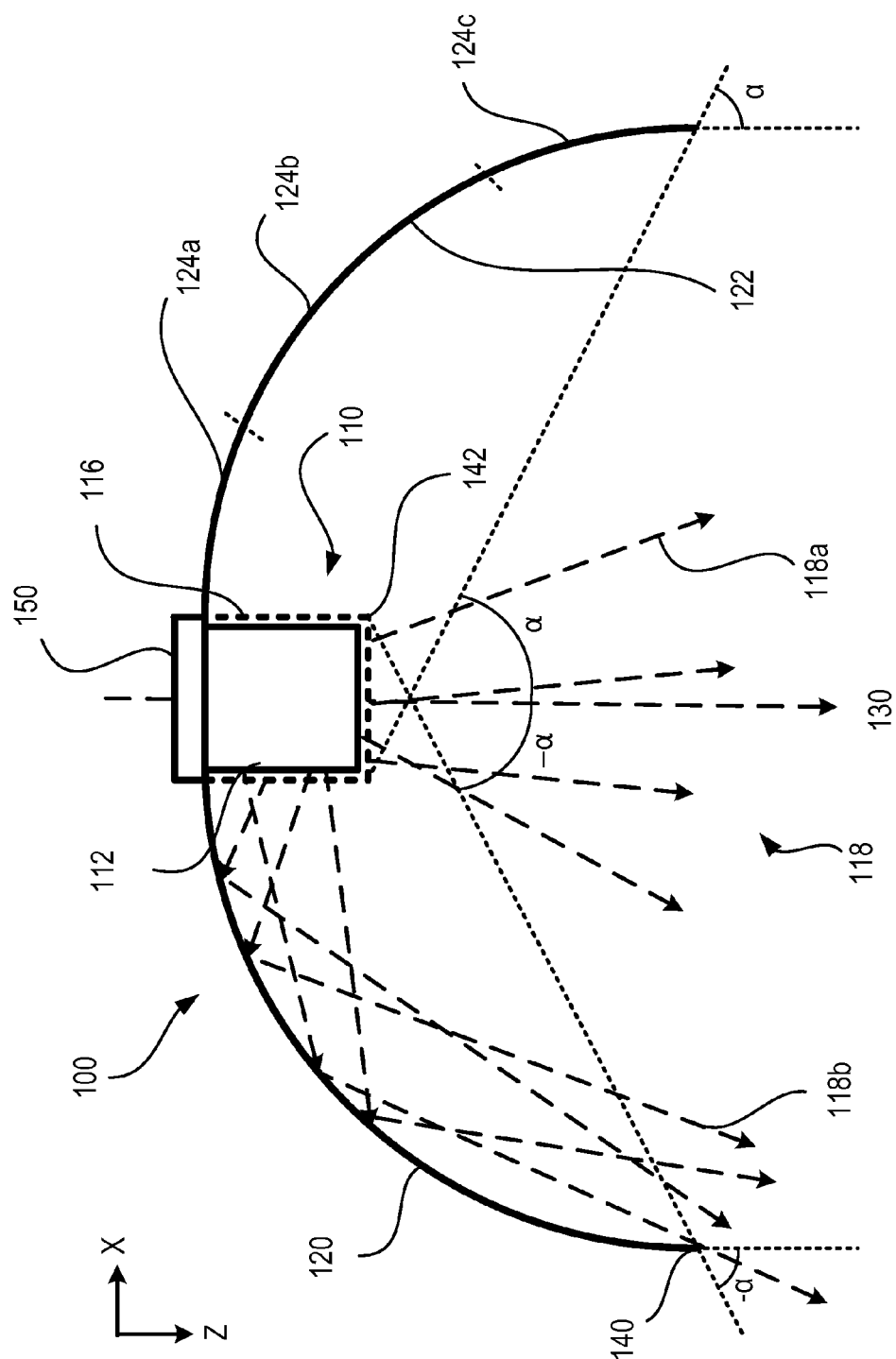
FIGS. 1A-B show cross-sectional views of an embodiment of a luminaire module.

Referring to FIG. 1A, in which a set of x-z axes is shown for reference, an example luminaire module 100 is shown in cross-section. Luminaire module 100 is an apparatus that delivers light within a pre-determined angular range from $-\alpha$ to $\alpha$ relative to the z-axis. $\alpha$ is also referred to herein as the beam angle. Luminaire module 100 includes a light emitting module 110 mounted on a base 150, and a reflector 120 extending from opposite sides of light emitting module 110 and positioned symmetrically about an axis 130, where axis 130 is parallel to the z-axis. Light produced by the light emitting module 110 exits the light emitting module 110 via light emitting portions 112 that extend spatially in the x-direction and the z-direction. In other words, light emitting module 110 is a spatially-extended light source in the x- and z-dimensions (i.e., a non-point source in these dimensions). While, in general, the x- and z-dimensions of the light emitting module 110 may vary, typically, they are at least about 1 cm in size (e.g., in a range from about 1 cm to about 20 cm, such as about 2 cm, about 3 cm, about 4 cm, about 5 cm, about 8 cm, about 10 cm, about 15 cm). As discussed in relation to specific examples of light emitting modules below, the x- and z-dimensions may be the same or may be different.

The light emitting portions 112 are fully contained within a notional design envelope 116 which, as will be explained in detail below, is used to guide the design of reflector 120 and its corresponding reflective surface 122, such that when any light exiting the light emitting portions 112 through the design envelope 116 strikes the reflective surface 122 of the reflector 120, the light does not return to the source and escapes from the luminaire module within a beam angle α with respect to the z-axis, with no more than a single reflection from reflector 120.

Light emitting module 110 also includes one or more light emitting elements (LEEs) (not shown), such as one or more light emitting diodes (LEDs). When the LEEs are active, they emit radiation in the form of light flux 118 that exits the light emitting module 110 from light emitting portion 112. Some of light flux 118 (e.g., depicted by rays 118a) is emitted from luminaire module 100 directly—without reflecting from reflector 120, and some of light flux 118 (e.g., depicted by rays 118b) reflects from reflector 120 before being emitted. Light flux 118 is emitted from luminaire module 100 within a beam angle α, which is determined as the angle between a) a notional line drawn from point 140 at an extreme end of reflector 120 and point 142 at the opposite corner of the design envelope 116, and b) a line parallel to axis 130. That is, light flux 118 from luminaire module 100 is emitted at an angle no greater than beam angle α, as light emitted from light emitting module 110 at angles greater than α will be occluded by the reflector, and the reflector is shaped to deliver light only within that angular range.

Base 150 is generally used to support light emitting module 110 and/or reflector 120, and is used to secure luminaire module 100 to a surface such as a wall, ceiling, or other surface. Base 150 can include, for example, a bracket, screw(s), nail(s), or other mounting components used to secure and support luminaire module 100 to a structure (e.g., a ceiling, wall, or stand). In some implementations, base 150 contains components that support the operation of light emitting module 110. For example, base 150 can include one or more electrical connectors to transfer power to light emitting module 110, and/or one or more heat sinks to dissipate heat from light emitting module 110. In some implementations, base 150 can include an interface that allows luminaire module 100 to connect to existing power and/or structural connectors. For instance, in some implementations, base 150 includes a connector that corresponds to a parabolic aluminized reflector (PAR)-type socket, such that luminaire module 100 can be powered by existing electrical configurations. In some implementations, base 150 can include connectors that are compatible with other types of sockets, for instance Edison mounts, bayonet mounts, bi-pin connectors, and other types of light bulb connection interfaces.

Reflector surface 122 is a specularly reflective surface (i.e., an angle of incidence of light on the surface is equal to the angle of reflection) and reflects light from light emitting module 110 through the aperture defined by the edge of reflector 120 within the angular range −α to α. Generally, α can vary as desired. For example, α can be in a range from about 20° to about 60° (e.g., about 30°, about 40°, about 45°, about 50°, about) 55°. A variety of materials can be used to provide reflector surface 122, including, for example, reflective metals (e.g., aluminum, silver), either as a coating or bulk metal.

As shown in FIG. 1A, reflector 120 is symmetric about axis 130. On each side of light emitting module 110, reflector 120 includes three segments, identified on the right hand side portion of reflector 120 as segments 124a-c. In cross section, each segment 124 is continuous with its adjoining segment(s) but has a curvature (i.e., as defined by a mathematical formula to which the reflective surface 122 is designed to conform) relative to adjacent segments. The shape of each segment is selected based on the dimensions of the notional design envelope 116 and/or the desired angular divergence of the light emitted by luminaire module 100, as characterized by angle α.

In general, reflector 120 is shaped according to principles of nonimaging optics in order to optimally transfer the light from light emitting module 110 for illumination rather than focus light to form an image. Nonimaging optical design depends primarily on the edge ray principle (see, e.g., W. Welford and R. Winston, The Optics of Nonimaging Concentrators, New York: Academic Press, 1978) to design optical systems having high optical efficiency. According to the edge ray principle, an ideal system (having maximum theoretical concentration and efficiency) transmitting radiation from an entry aperture to an exit aperture has the property that extreme rays of the entry aperture pass the exit aperture likewise as extreme rays. All other rays originating within the entry aperture traverse the system to lie at angles and/or positions within those of the extreme rays, and are thus also transmitted without loss. The edge ray principle was originally developed to describe reflecting optical systems, but has since been generalized to include refractive systems. Similarly, although nonimaging optics was originally formulated for application to concentrating systems, in which light incident on an optical system over a range of angles is concentrated to a smaller area (over a larger range of angles), it has since been applied to illumination systems in which light from a light source emitting over a range of angles is "collimated" by an optical system to emerge from a larger aperture over a smaller range of angles. The edge-ray design principle as applied to light sources can be formulated as follows: rays originating at an edge point of the extended light source should propagate at the maximum divergence angle of the output beam after leaving the collimator. Rays originating at points within the edge of the light source should all emerge at angles within the maximum divergence angle. Satisfying this condition leads to well-formed far-field patterns with desirable edge steepness (light remaining within a designed maximum divergence angle). Accordingly, for embodiments disclosed herein, configurations of the reflector surface 122 are determined based upon the dimensions of the design envelope 116 in combination with a desired beam angle α of the light output via the exit aperture 190 of the luminaire module.

Figure 1B:
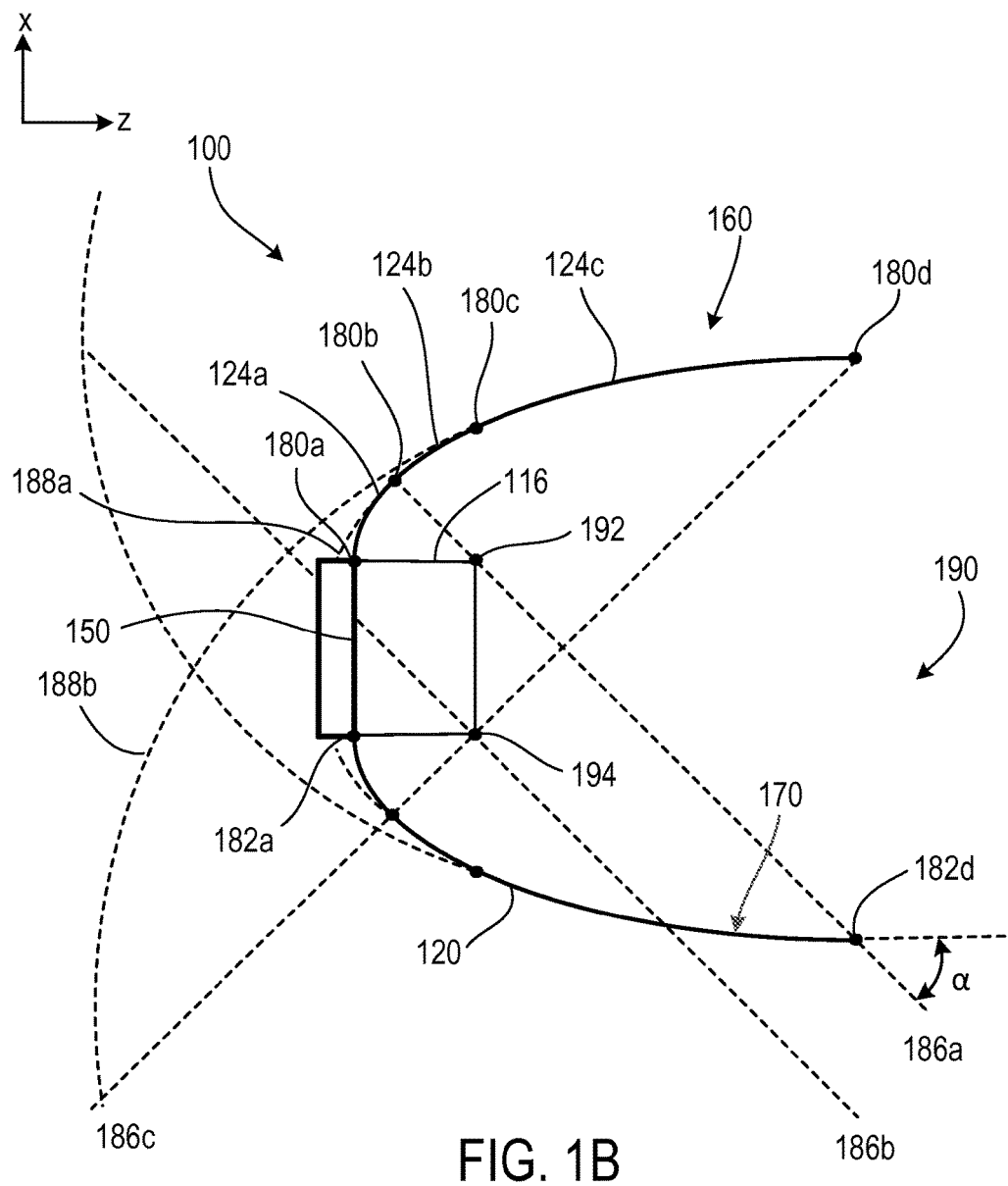

Referring also to FIG. 1B, which shows luminaire module 100 along with a series of construction lines and points related to the curvature of reflector segments, reflector 120 includes a first side portion 160 and a second side portion 170. The first side portion 160 includes segments 124a, 124b, and 124c, which extend between pairs of points 180a and 180b, 180b and 180c, and 180c and 180d, respectively. The side portion 170 extends from point 182a to point 182b. Construction lines 186a, 186b and 186c are also illustrated.

Segments 124*a-c* are point-to-point and slope continuous at points 180*b* and 180*c* (indicated by solid circles) where they meet, such that the reflective surface of reflector portion 160 is a continuous and slope continuous surface in cross-section. Nevertheless, the curvature of segments 124*a*, 124*b*, and 124*c* are different. The construction line 186*a* is the line extending between the design envelope 116 at the upper right corner 192 and the end of reflector portion 170 at point 182*d*. This line intersects the z-axis at the angle $-\alpha$. Note that construction line 186*a* represents the steepest angle presenting a direct line of sight from outside of luminaire module 100 to the design envelope 116. Thus, minimal light emanating from within design envelope 116 directly exits (i.e., without scattering or reflecting off a surface) at an angle steeper than $-\alpha$. Construction line 186*c* similarly extends from the lower right corner 194 of design envelope 116 to point 180*d* of reflector portion 160.

The construction line 186*a* intersects the reflector 120 at 180*b* where the segment 124*a* meets the segment 124*b*. The segment 124*a* meets the base 150 at point 180*a* that starts at the upper left corner of the design envelope 116.

Turning now to the shape of segments 124*a-c*, segment 124*a* is circular. The center of this circular segment coincides with corner 192 and has a radius corresponding to the distance from 180*a* to 192. This means that light propagating from point 192 in the $-z$ direction is normally incident on segment 124*a* and reflects to propagate in the $+z$ direction. Light propagating from point 192 incident on any other portion of segment 124*a* reflects away from design envelope 116. In other words, minimal light (e.g., no light) from point 192 incident on segment 124*a* reflects back towards design envelope 116. Similarly, rays from the upper surface of design envelope 116 (i.e., between 180*a* and 192) striking this segment do not return to the upper surface but escape past the source box within the design angle limit.

Segment 124*b* is a parabolic segment for which construction line 186*a* is the parabolic axis. The pole for this parabola is at point 180*b* where it meets segment 124*a*. The focus of the parabola of segment 124*b* coincides with point 192 at the upper right corner of the design envelope 116. The radius of curvature at the parabolic segment pole 180*b* is thus exactly twice the radius of the circular segment 124*a*, since it is twice the focal length of the parabola. A portion of the parabola forming the segment 124*b* and extending beyond point 180*b* is shown as 188*a* extending symmetrically about this axis, to indicate the geometric arrangement. 188*a*, of course, is notional only and does not form a tangible part of the reflector 120. The segment 124*b* terminates at point 180*c*, which is a point vertically (i.e., in the x-direction) above the right end face of the source and the parabola focus 192.

Segment 124*c* is also a parabolic segment, but has a curvature different from segment 124*b*. The second construction line 186*b* originates at point 194 at the lower right corner of the design envelope 116. Point 194 is the focus of the second parabola which forms segment 124*c*. Its focal length and polar radius of curvature is chosen so that the second parabolic segment 124*c* connects continuously in position and slope with the terminus of the first parabolic arc at point 180*c*.

The second parabolic segment 124*c* terminates at the point where it meets the third construction line 186*c*, which is simply the mirror image of the second construction line 186*b* relative to an axis through points 182*a* and 194. The portion 188*b* of the parabola forming segment 124*c* and extending beyond point 180*c* is shown to indicate the geometric arrangement. Like 188*a*, 188*b* is notional only and does not form a tangible part of reflector 120.

As such, the three segments 124*a-c* of the first portion 160 of the reflector are uniquely defined from the dimensions of the design envelope 116 and the desired beam angle $\alpha$ for the flux emerging from the reflector 120.

As noted previously, reflector 120 is symmetric about the z-axis, so portion 170 includes segments corresponding to segments 124*a-c* of portion 160. Furthermore, FIGS. 1A and 1B show a cross-sectional profile of luminaire module 100. In general, this profile can remain the same in the y-direction (i.e., out of the plane of the page) or can vary. For instance, in certain embodiments, reflector 120 is trough-shaped and the cross-sectional profile remains unchanged for some length out of the plane of the page (i.e., the reflector has translational symmetry). Alternatively, in some embodiments, luminaire module has rotational symmetry about axis 130. Other geometries are also contemplated and certain examples are discussed below.

For example, while the first side portion 160 and the second side portion 170 are described above as having a mirror symmetric configuration about a plane of translational symmetry, the two side portions 160 and 170 are not required to be mirror symmetric. For instance, in some implementations, the configuration of the second portion 170 of the reflector 120 can be identical, similar or different to the configuration of the first portion 160. For example, the second portion 170 can include the same number and types of arcs and define like beam angles or it can be based on a different beam angle and/or comprise a different numbers and/or types of arcs.

In some implementations, for example if the reflector 120 has a rectangular cross section perpendicular to the sectional plane of FIG. 1B or other discrete rotational symmetry, like configurations can apply to other portions of the reflector. For example, like configurations can apply to such portions that have an orthogonal or other orientation to the portions 160 and 170 with respect to a symmetry axis of the reflector optic.

In some implementations, the design envelope 116 does not fully enclose light emitting portion 112 of light emitting module 110, and instead partially encloses light emitting portion 112. In these embodiments, light emitted by the enclosed portion of light emitting portion 112 does not return to the source, and escapes from the luminaire module within a beam angle $\alpha$ with respect to the z-axis, with no more than a single reflection from reflector 120. Light emitted by the non-enclosed portion of light emitting portion 112 may or may not behave in a similar manner.

The light emitting portions of a light emitting module configured as a flat extended source can be enclosed in a notional design envelope, such that all of its light emitting portions are contained within the notional envelope. As described above, a reflector can be designed based on the dimensions of the design envelope, such that when any light exiting the light emitting portions strikes the reflector, the light does not return to the source and escapes from the luminaire module within a beam angle $\alpha$.

Figure 2:
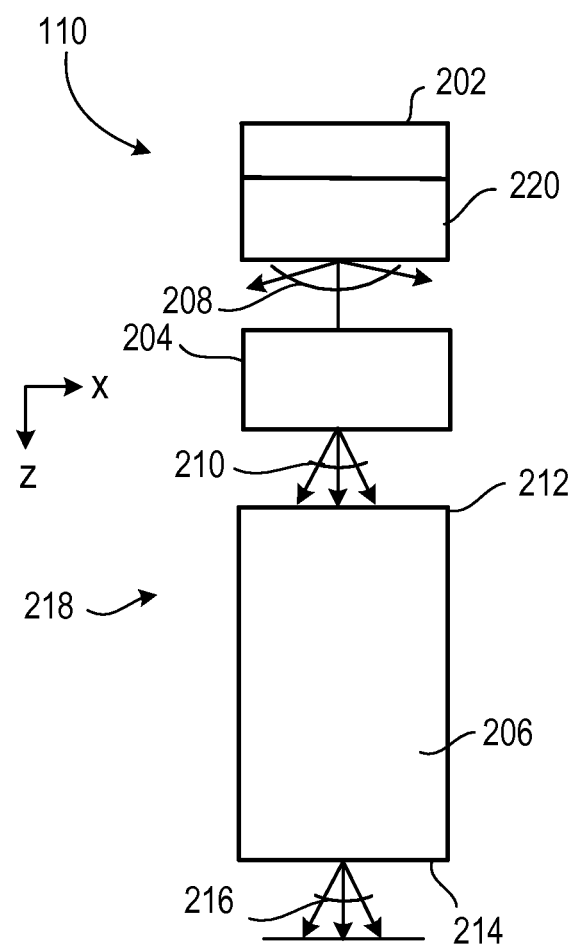
FIG. 2 is a schematic diagram of a light emitting module that includes a light guide.

Turning now to the light emitting module 110, in general, a variety of form factors can be used to provide a spatially-extended source. For example, referring to FIG. 2, in certain embodiments light emitting module 110 utilizes a leaky light guide to provide a spatially-extended source. Here, light emitting module 110 includes a substrate 202 (e.g., that corresponds to base 150 in FIGS. 1A and 1B), one or more LEEs 220 disposed on the substrate 202, one or more optical couplers 204, and a leaky light guide 206. Light emitted by LEEs 220 exits the light emitting module 110 from the leaky light guide.

The LEEs 220 emit light, during operation, in a first angular range 208 with respect to a normal to the substrate 202 (e.g., the direction of the z-axis). For example, a divergence of the first angular range 208 of the light emitted by the LEEs 220 can be 150-180 sr around the normal. Optical couplers 204 receive light in the first angular range 208 from LEEs 220. Each optical coupler 204 is configured to redirect the light received in the first angular range 208 into a light with a second angular range 210 and redirect it into a first end 212 of light guide 206. For example, a divergence of the second angular range 210 of the light provided by the optical couplers 204 can be 90 sr around the normal (+/−45 sr).

In general, LEEs emit radiation in a region or combination of regions of the electromagnetic spectrum, for example, the visible region, infrared and/or ultraviolet region, when activated by applying a potential difference across it or passing a current through it, for example. A LEE can have monochromatic, quasi-monochromatic, polychromatic or broadband spectral emission characteristics. Examples of LEEs include semiconductor, organic, polymer/polymeric light-emitting diodes, other monochromatic, quasi-monochromatic or other light-emitting elements. The term LEE can refer to the specific device that emits the radiation, for example a LED die, and can equally be used to define a combination of the specific device that emits the radiation together with a housing or package within which the specific device or devices are placed. Further examples of LEEs as the term is used herein include lasers, for example, semiconductor lasers, such as vertical cavity surface emitting lasers (VCSELs) and edge emitting lasers. Further examples include superluminescent diodes and other superluminescent devices.

In general, light emitting module 110 is configured to generate light of a desired chromaticity. In many applications, light emitting module 110 is configured to provide broadband light. Broadband light can be generated using nominally white or off-white LEEs or colored LEEs whose emissions are mixed to provide white light. Alternatively, or additionally, white light can be generated using an LEE configured to emit pump light (e.g., blue, violet or ultraviolet light) in conjunction with a wavelength conversion material. For example, in certain embodiments, LEEs 112 include GaN-based pump LEDs with an overlying phosphor layer (e.g., YAG) that creates yellow, red and/or green components to produce white light.

In some embodiments, light emitting module 110 may be configured to provide colored light (e.g., yellow, red, green, blue light). Different LEEs in light emitting module 110 can be configured to emit nominally different light under operating conditions, for example yellow, red, green, blue, white or other color light.

In general, relatively energy efficient LEEs can be used. For example, LEEs 220 can have an output efficiency of about 50 lm/W or more (e.g., about 75 lm/W or more, about 100 lm/W, about 125 lm/W or more, about 150 lm/W or more). In certain embodiments, LEEs 112 conduct current greater than about 350 mA (e.g., 400 mA or more, 450 mA or more, 500 mA or more). LEEs may be surface mount devices.

The number of LEEs in a light emitting module can vary. In some embodiments, light emitting module 110 can include relatively few LEEs (e.g., 10 or fewer). In some cases, light emitting module 110 can include a large number of LEEs (e.g., 100 or more). In many applications, however, light emitting module 110 includes between 4 and 100 LEEs.

Optical coupler(s) 204 are configured to receive light from one or more of the LEEs that are suitably disposed at an entrance aperture of the optical coupler. In embodiments that feature multiple optical couplers, they may be integrally formed. Each optical coupler can be configured to provide a predetermined amount of light at an exit aperture of the optical coupler. For this purpose, each optical coupler is optically coupled with the corresponding LEEs and the light guide. Adjacent optical couplers may be optically isolated or optically coupled to control cross talk and/or collimation of light or other functions in one or more planes parallel to the optical axes of the optical couplers or in other directions.

The optical couplers are configured to allow coupling of a predetermined amount of light from one or more of the LEEs into the optical couplers and a predetermined amount of that light is provided at the exit apertures of the optical couplers. Each optical coupler is configured to transform light as it interacts with the optical coupler between the entrance aperture and the exit aperture. Such transformations, also referred to as conditioning, may be regarded as transformations of the phase space of light including collimation of light (e.g., causing a reduction of the divergence of the coupled light) or other transformations, and/or preservation of etendue, light flux and/or other parameters, for example. In some embodiments, the optical couplers are configured to provide light with predetermined properties to control light losses in other components of the light emitting module, including one or more of the light guide 206 or other components of the light emitting module. For example, the optical couplers may be configured so that substantially all light provided thereby can propagate through the light guide 206, has less than a predetermined divergence, is injected into the light guide at suitable angles relative to the optical interfaces of the light guide 206 or has other properties.

Optical couplers can include one or more optical elements including nonimaging dielectric TIR concentrators, such as CPC (compound parabolic concentrators), CECs (compound elliptical concentrators), CRC (compound hyperbolic concentrators), tapered or untapered portions, light pipes, segmented concentrators, other geometry concentrators, one or more lenses or other optical elements, for example. In some embodiments, optical couplers and LEEs are integrally formed as a single component.

A light emitting module may include a number of optical couplers that are the same as each other or different. Optical couplers may have equal or different profiles or cross sections in different directions. In some embodiments, optical couplers may have varying configurations depending on their location within a cluster or group of optical couplers. For example, optical couplers proximate the ends of an elongate luminaire module may be configured with properties different from those of optical couplers near the center of the light emitting module. Like considerations may apply in embodiments in which the optical couplers are disposed in clusters proximate an optical axis. For example, optical couplers proximate the periphery of a cluster may be configured with properties different from those proximate the optical axis. An optical coupler may have rotationally symmetric and/or asymmetric cross sections, for example it may have parabolic, elliptical, circular, hyperbolic, triangular, square, rectangular, hexagonal or other regular or irregular polygonal or other cross sections.

A portion or all of the optical coupler 204 may be made of a solid transparent body configured to propagate light internally and solely, partially or not at all, depending on whether a specular reflective coating is employed on the outside of the solid transparent body, rely on TIR, or may be configured to provide a through hole that is partially or fully reflectively coated on one or more optical surfaces. Like consideration may apply to the light guide 206 or other components of the light emitting module, for example. Depending on the embodiment, one or more optical couplers 204 may be configured as hollow, reflectively coated non-imaging optical couplers. One or more of the optical couplers 204 may include a dielectric collimating optic configured to provide a predetermined collimation angle. The collimation angle may be determined by the length and/or shape of respective surfaces of the optical coupler 204, for example. An optical coupler 204 may be configured to provide substantially equal collimation about an optical axis in rotationally symmetrical configurations or may provide different collimation in different directions with respect to an optical plane of the optical coupler and/or other component of the light emitting module, for example.

The light guide 206 guides light to a distal end 214 of the light guide 206 away from LEEs 220, while emitting at least some of the light from the edges of the light guide between first end 212 and distal end 214. Light guide 206 is a leaky edge-fed light guide and can be fed with light emitted by one or more light emitting devices (e.g., packaged or un-packaged LEDs) placed at one or more ends of the extended light source, in as many sections as required for the number of driver LEDs. For example, light from one or more LEDs can be fed into the flat-shaped extended light source from one end, two ends, three, or four ends. Similarly, light from one or more LEDs can be fed into the rod-shaped extended light source from one end or two ends, for example.

Figures 3A, 3B, 3C:
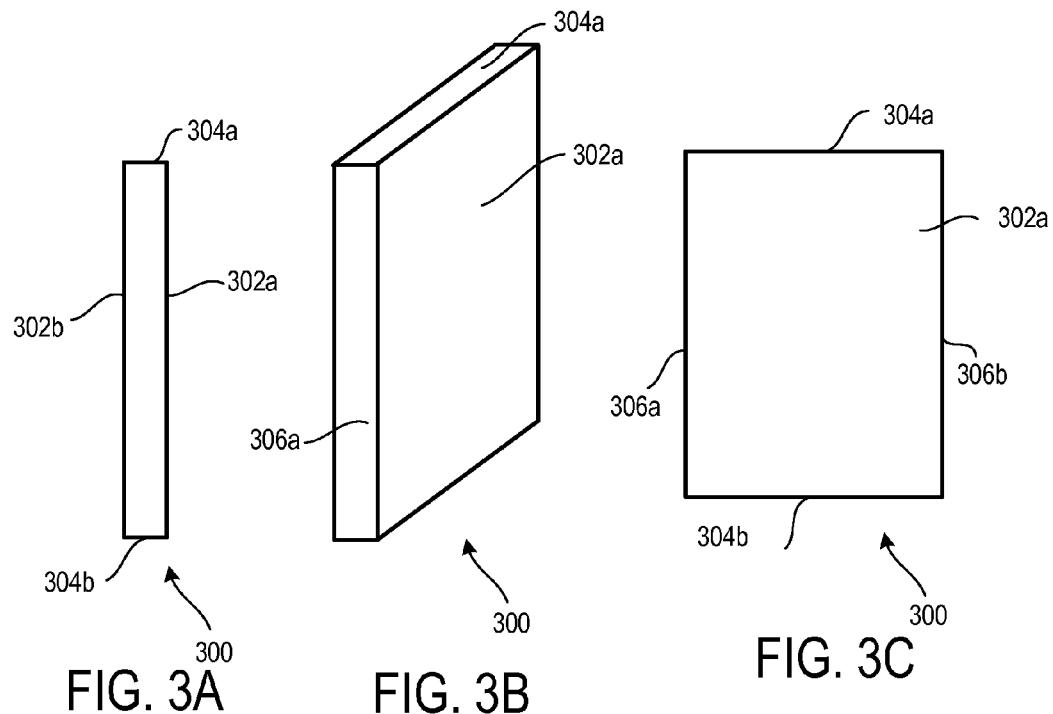
FIGS. 3A-C show different views of an embodiment of a light guide.

Referring to FIGS. 3A-3C, in some embodiments, the light guide is in the form of a transparent slab 300 of material having with parallel faces 302a and 302b that extend between opposite ends 304a and 304b and opposite sides 306a and 306b. End 304a corresponds to end 212 in light emitting module 110 shown in FIG. 2. Generally, such light guides are formed of a dielectric material such as an inorganic dielectric (e.g., $SiO_2$) or an organic polymer dielectric, such as an acrylic polymer.

The dimensions of light guide 300 may vary as desired. Generally, the thickness of the light guide (i.e., the dimension between faces 302a and 302b) is substantially smaller that the height (i.e., from 304a to 304b) or depth (i.e., from 306a to 306b) of the light guide. In some embodiments, light guide 300 has a thickness of about 1 cm or less (e.g., 0.5 cm or less, 0.2 cm or less). The light guide 300 can have a height of about 2 cm or more (e.g., 3 cm or more, 5 cm or more, 10 cm or more, such as up to about 30 cm). Generally, the breadth depends of the size of the luminaire module in which the light guide is used. The breadth can be about 5 cm or more (e.g., about 10 cm or more, about 20 cm or more, about 30 cm or more). Generally, the light guide can correspond to the light emitting portion 112 of light emitting module 110 described above, and the notional design envelope 116 can correspond to the dimensions of the light guide as shown in FIG. 3A.

Faces 302a and 302b include features that frustrate total internal refraction of guided light at these faces, causing light to leak from the faces and the faces to appear bright. Generally, such features, referred to as extraction features, can take a variety of forms. For example, extraction features can be textured features formed on the faces (e.g., through scoring, scratching, sand-blasting, embossing or etching processes). Alternatively, extraction features, such as ink dots, can be formed by depositing (e.g., printing) features onto the otherwise flat faces. Optionally, some ink dots may include wavelength-conversion material configured to convert the wavelength of light. The extraction features can operate to frustrate TIR in the light guide by refracting, diffracting, and/or scattering guided light at the faces. Generally, the size, shape, and pattern of the extraction features can vary depending on how the features operate to frustrate TIR. Typically, the extraction features are relatively small (e.g., on the order of tens of microns in dimension or smaller). The distribution of extraction features can also vary as desired. They may vary across faces 302a and 302b in order to provide homogeneous light extraction across the faces, or in order to create intensity gradients across the faces. Extraction features may also be selected to extract light in preferably in one or more directions relative to other directions. In some implementations, the index of refraction of the light guide can be graded such that light rays that travels inside the guide, bend outward, and escape from the light guide through the faces.

Exemplary light guides including extraction features are described, for example, in U.S. 2013/0216182, although there the light guide is used for a LCD panel, not a luminaire. Exemplary leaky light guides are also disclosed, for example, in U.S. 2012/0236590.

Figures 4A, 4B:
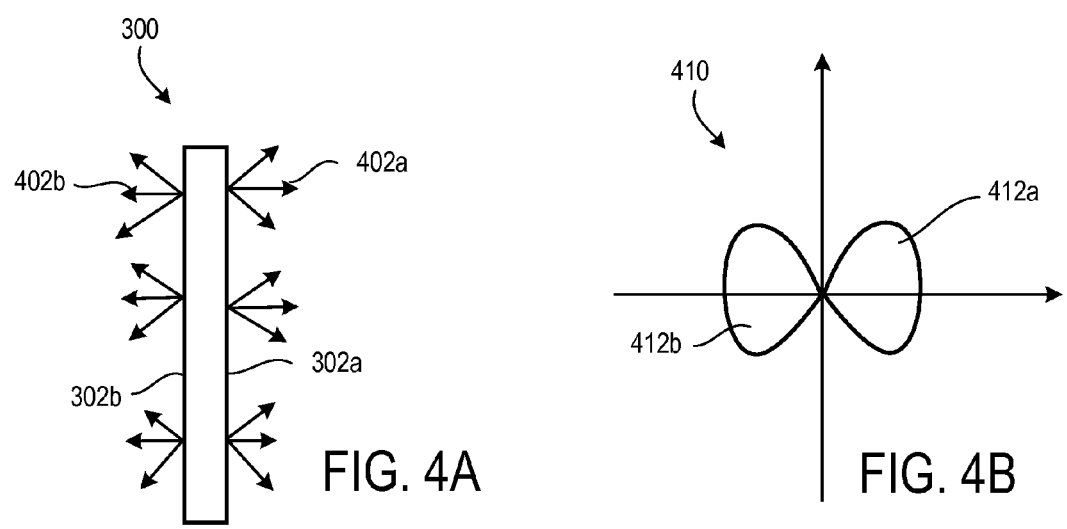
FIG. 4A shows example light flux patterns emitted by the light guide shown in FIGS. 3A-C.
FIG. 4B shows an exemplary light distribution pattern from the light guide shown in FIGS. 3A-C.

Referring to FIG. 4A, due to the extraction features on faces 302a and 302b, the two largest opposing faces 302a and 302b of the light guide 300 are the primary light emitting portions. Light guide 300 emits a light flux 402a from face 302a into a range of directions relative to the normal to face 302a, and emits a light flux 402b from face 302b into a similar range of directions about the normal to that face. The intensity of this light flux is uniform along the entire length of the light guide. Referring to FIG. 4B which shows a plot of the light distribution pattern from light guide 300, in some embodiments, the light distribution can be symmetric from both faces, and can be symmetric about the normal to faces 302a and 302b, at least for the cross-section shown in FIG. 4A. A lobe 412a of the flux distribution pattern 410 corresponds to the light flux 402a emitted from the face 302a, and a lobe 412b of the flux distribution pattern 410 corresponds to the light flux 402b emitted from the face 302b. In general, the angular distribution of light from a leaky light guide can vary. In some embodiments, emission can be substantially Lambertian (e.g., falls off as a cosine function about a direction normal to the faces). In certain embodiments, emission can be predominantly in a direction non-normal to the faces, with some distribution about the predominant direction.

In some implementations, one or more "cold" ends of a light guide through which light is not being fed into the extended light source can have corresponding reflecting surfaces (e.g., retro-reflector cubes) to keep the light from escaping from this end and to redirect it back into the light guide.

Furthermore, while light guide 300 is a slab-shaped light guide, other shapes are also possible. For example, in some embodiments, wedge-shaped (i.e., tapered) light guides can be used.

In general, the components of light emitting module 110 are arranged to redirect light emitted from LEEs 220 away from the LEEs before the light is emitted into the ambient environment from the light emitting module. Separating the LEEs, with their predetermined optical, thermal, electrical and mechanical constraints, from the place of light extraction, may facilitate a greater degree of design freedom of the optical system of the luminaire module and allows for an extended optical path, which can permit a predetermined level of light mixing before light is emitted from the light emitting module. Thus, light emitting module 110 may be configured to provide predetermined illumination with good aesthetics that may be useful for a wide range of lighting applications.

Figure 5A:
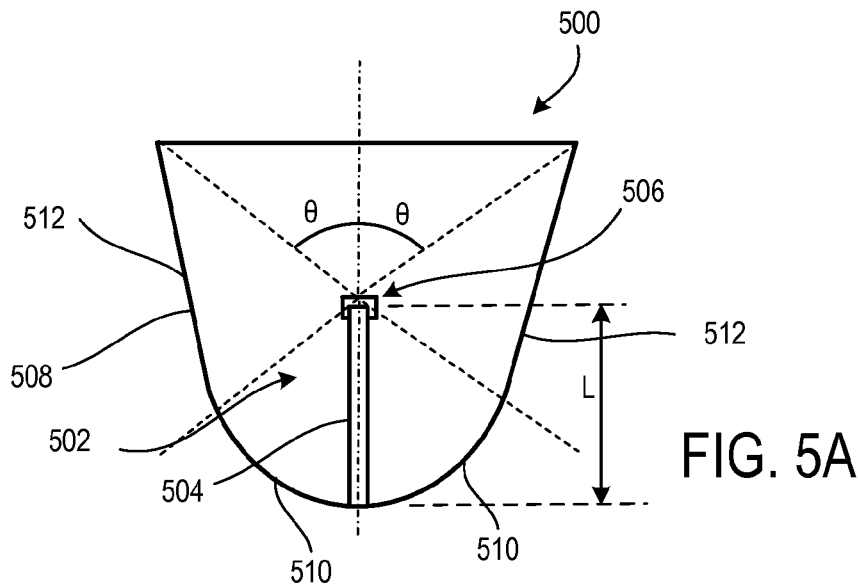
FIGS. 5A-D show different views of another embodiment of a luminaire module.
Figure 5B:
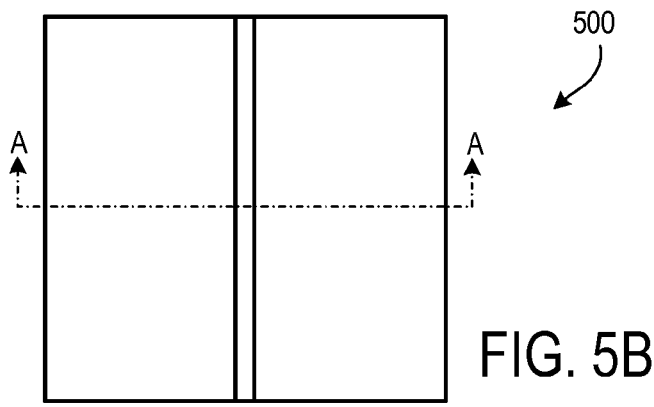

As noted previously, in the foregoing embodiment, the LEEs are positioned at the base of the luminaire module and the reflector of the luminaire module is designed based on a design envelope corresponding to the cross-sectional dimensions of the light guide. However, other configurations are also possible. Referring to FIGS. 5A-5D, for example, in some embodiments, a light emitting module may be considered to be spatially-extended in only a single dimension in cross-section, and a corresponding design envelope is used in shaping the reflector. Here, FIG. 5A shows a cross-section of luminaire module 500 and FIG. 5B shows the corresponding plan view of a luminaire module 500. The luminaire module 500 includes the following components: a light emitting module 502 (including a light guide 504 and a LEE subassembly 506), and a reflector 508 having a compound geometry. Each portion of reflector 508 includes two segments: a circular segment 510 of radius L (where L is the length of the light guide 504), and a parabolic segment 512 of focal length L, tipped at angle θ, and extended until it intersects the mirrored parabola axis. The geometry shown here ensures that all the light flux produced by the light emitting module escapes and that the light flux is limited to ±θ in its radiation pattern.

Figure 5C:
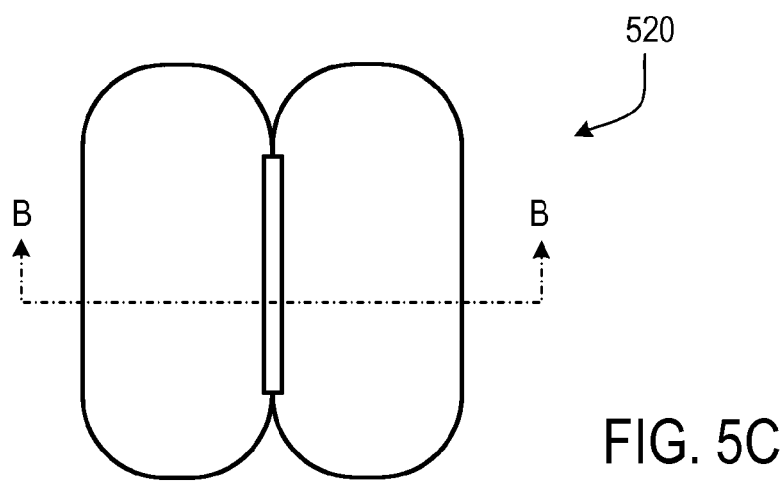

While luminaire module 500 has a rectangular footprint as shown in FIG. 5B, FIG. 5C shows an alternate implementation of a luminaire module 520. The luminaire module 520 is configured to provide more uniform luminance of the off-axis flux than the luminaire module 500, by keeping the off-axis (skew) rays within the ±θ viewing angle.

Figure 5D:
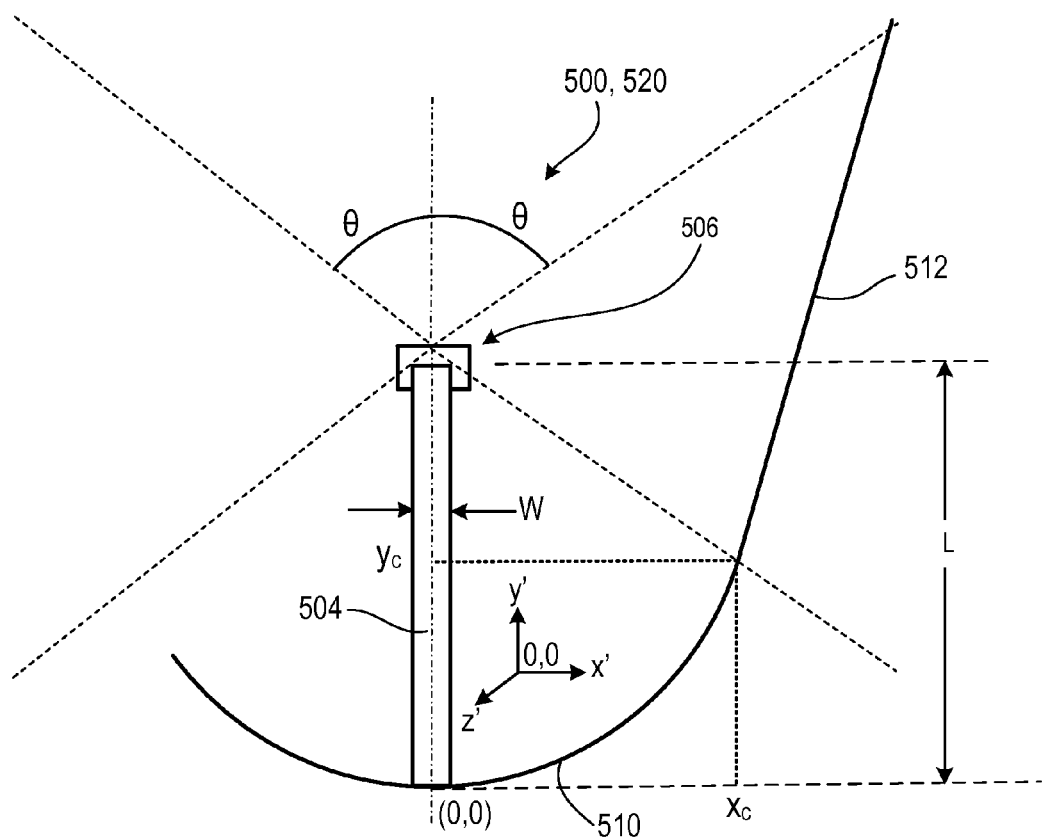

FIG. 5D shows a detail view of the circle portion 510 of the cross-section of a recessed can LED luminaire module 500 or 520. The circle portion 510 of the cross section begins flat and coplanar to the bottom of the light guide 504, with radius L. With the origin at the bottom mid-plane of the light guide 504, the circle 510 extends counter clockwise up to a point $(x_c, y_c)$, where $x_c=L \sin \theta+W/2$, and $y_c=L(1-\cos \theta)$, and where the width of the light guide 504 is W. The parabolic section "P" is designed to have the vertex at $(x_c, y_c)$ and the tipped axis as shown in FIG. 5D. The effect of the tipped parabola 512 is to reflect flux originating at x=W/2, y=L and hitting the parabola 512 to θ, and all flux between y=0 and L being between ±θ, and a distinct cut off of flux ≥θ.

Figure 6:
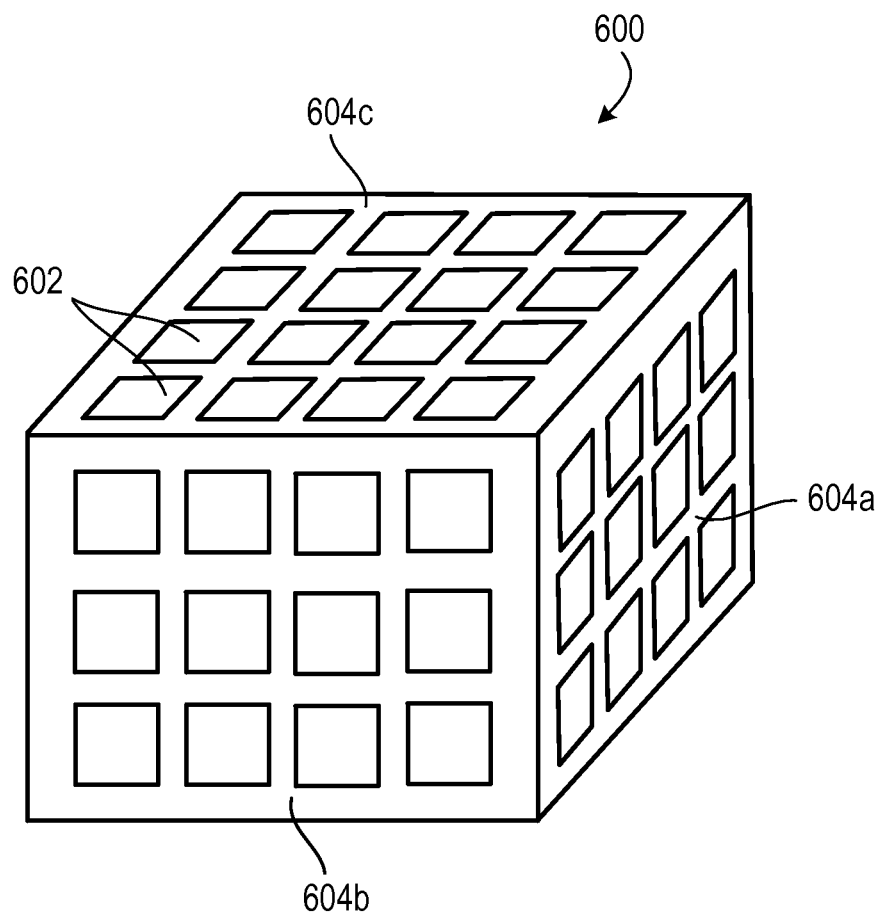
FIG. 6 shows a perspective view of another embodiment of a light emitting module.

The foregoing examples feature light emitting modules that incorporate leaky light guides. However, other light emitting modules may also be used. For example, in some embodiments, the light emitting module can include arrays of LEE's that collectively provide a spatially-extended light source. Referring to FIG. 6, for example, in some implementations, the light emitting module may be in the form of a cuboid. Here, light emitting module 600 includes multiple LEEs 602 that are disposed in a cuboid arrangement on five faces (only three faces 604a, 604b and 604c shown) of a cuboid base. In general, the number of LEEs on each face may vary as desired. In this example, the light emitting module 600 includes 16 LEEs disposed on face 604c, which faces the exit aperture of the reflector of a luminaire module (i.e., exit aperture 190 of the luminaire module 100, as illustrated in FIG. 1B), while faces 604a and 604b each include 12 LEEs. In some implementations, certain faces may be free of LEEs.

The light emitting module 600 can include a thermally conducting center with which the LEEs 602 of the light emitting module 600 are coupled. Such coupling can be, for example, via one or more substrates per face of the light emitting module or each LEE can have its own separate substrate (not illustrated) distinct from the substrates of the other LEEs.

In some implementations, the LEEs in the light emitting module can be regularly arranged as illustrated in FIG. 6, or irregularly arranged (not illustrated) on one or more faces of the light emitting module.

In some implementations, LEEs from different faces or different LEEs on the same face can be selectively activated to provide a form of spatial dimming to control the light emission pattern of the luminaire module. Such spatial dimming can be achieved, for example, by grouping the LEEs of each face of the light emitting module into an array of LEEs so the LEE arrays can then be selectively activated, for example. Spatial dimming can also be achieved by selectively activating individual LEEs. Furthermore, selective activation of individual LEEs can be combined with selective activation of LEE arrays. In such cases, the luminaire module further includes a suitably configured control system to enable spatial dimming.

In general, the size of module 600 can vary as desired. Moreover, while module 600 is cuboid (i.e., each face 604a, 604b, and 604c have the same size), more generally, the relative size of each face may be different. In some implementations, the dimension (e.g., length or breadth) of each face can be up to 2.5 mm or larger in size (e.g., about 5 cm or more).

The LEEs can be disposed on thin PC boards or flex circuits thermally coupled to a heat sink substrate. The thermal coupling can be established by common attachment methods, such as double-sided adhesive tapes or per other processes, for example.

An example light emitting module with perhaps as many as about 60 LEDs, each consuming around 200 mW of electric power, for a total input of 12 W, can yield a total flux of the order of 1600 to 1800 lumens of white light. Such arrays can be series connected strings of perhaps six LEDs to run off approximately 20 Volts. Many such configurations and power levels are possible.

In some implementations, the heat generated by such a source can be only half the applied electric power. Due to this limitation, the light emitting modules can include optical structures made from highly specular reflective materials designed according to the earlier nonimaging principles to derive practical luminaire modules and/or components thereof.

It is noted that the faces of the light emitting module can have other than square emitting areas. For example, the emitting areas can be circular or rectangular. Such configurations can depend on desired illumination properties of the luminaire module.

In some embodiments, a box or cuboid-like light emitting module of the type illustrated in FIG. 6 can be incorporated into a reflector that includes a reflector that has a square or rectangular footprint, for example. Such a reflector can be tailored to a variety of distribution angles according to the needs of particular luminaire product as described herein.

The design envelope for shaping a reflector for use with light emitting modules that are composed of arrays of LEEs, such as the cuboid module shown in FIG. 6, are generally selected so that the envelope's dimensions are the same as or slightly larger than (so as to encompass) the module.

Figure 7A:
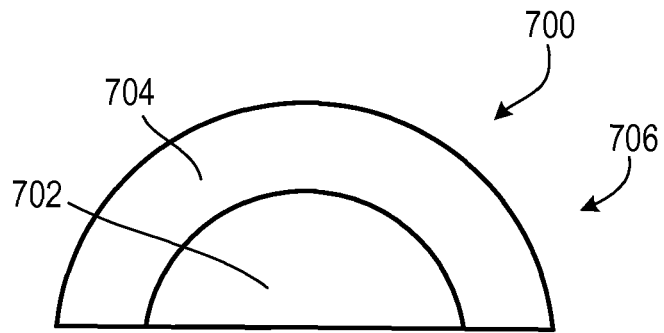
FIGS. 7A-C show cross-sectional views of further embodiments of light emitting modules having semi-circular cross-sections.

Other types of spatially-extended light emitting modules can also be used. For instance, referring to FIGS. 7A-7C, in some embodiments, a light emitting module can have a semicircular cross-section, for example a hemispherical ASLV (Asymmetric Light Valve) light source. Examples of ASLV type emitters are described in commonly-owned patent application U.S. 2013/078463, for example. FIG. 7A shows an example light emitting module 700, where a light emitting element 702 is covered by a layer of light-conversion material 704 with a semicircular cross-section. Light emitted by the LEE 702 is converted into light having a different wavelength, then exits from light emitting portion 706. For instance, LEE 702 may emit blue light, and the emitted light is converted to white light by the light-conversion material 704. Light-conversion material 704 may include, for example, a phosphor.

Figure 7B:
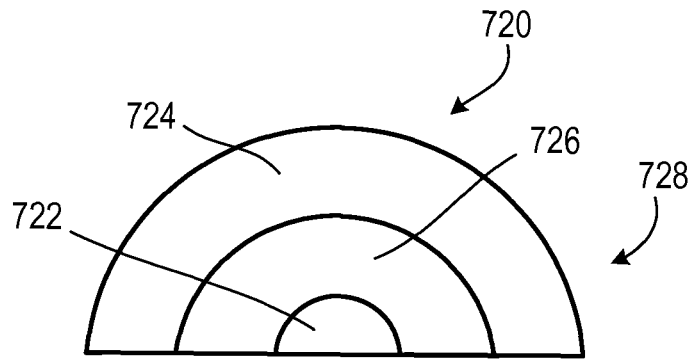

Referring to FIG. 7B, in some implementations, a light emitting module 720 includes a layer of light conversion-material 724 positioned remote from a light emitting element 722 and separated from the light emitting element 722 by a layer 726 of a low index medium, such as air or other gas. Light emitted by the light emitting element 722 passes through layer 726, is converted into light having a different wavelength by light conversion-material 724, and then exits from the light emitting portion 728.

Figure 7C:
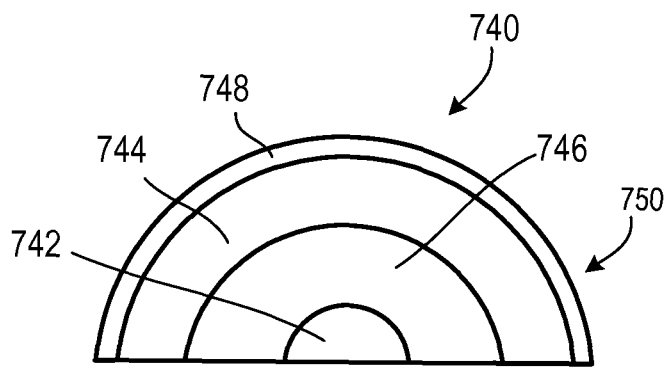

Such light emitting modules can include a lens element that covers the layer of light conversion material. Referring to FIG. 7C, for example, a light emitting module 740 has a layer of light conversion material 744 positioned remote from the light emitting element 742 and separated by low-index layer 746, and the layer of light conversion material 744 is covered with a lens element 748 having a circular cross-section. Light emitted by the light emitting element 742 passes through air layer 746, is converted into light having a different wavelength by light conversion-material 744, passes through lens element 748, and then exits from the light emitting portion 750.

Just as for the generic light emitting module shown in FIGS. 1A and 1B, a rectangular design envelope can be used to shape reflectors for light emitting modules having semi-circular cross-sectional profiles. For example, referring to FIG. 8A, design envelope 116 can sized to encompass light emitting module 700 (FIG. 7A). In other words, the design envelope extends in the z-direction by an amount equal to the radius of the semi-circle of the light emitting module, which the lateral dimension (in the x-direction) equals the semi-circle's diameter. As described above, a reflector 120 can be designed based on the dimensions of the design envelope 116, such that substantially no rays exiting the light emitting module 110 can be returned to it from the reflector 120. As an example, for a light emitting module with a 10.0 mm radius dome lens, the circumscribed design envelope is 20 mm×20 mm×10 mm, and for a beam angle of 53° 8', (3-4-5 triangle) the reflector exit aperture is 50.0 mm square (i.e., the reflector has a square footprint, the reflector being symmetric through 90° rotations about the z-axis) and the total reflector depth is 36.25 mm for a complete untruncated reflector. If required, a rotational version of this reflector yields a 50 mm diameter cell suitable for some wide angle MR16 type devices.

Figure 8A:
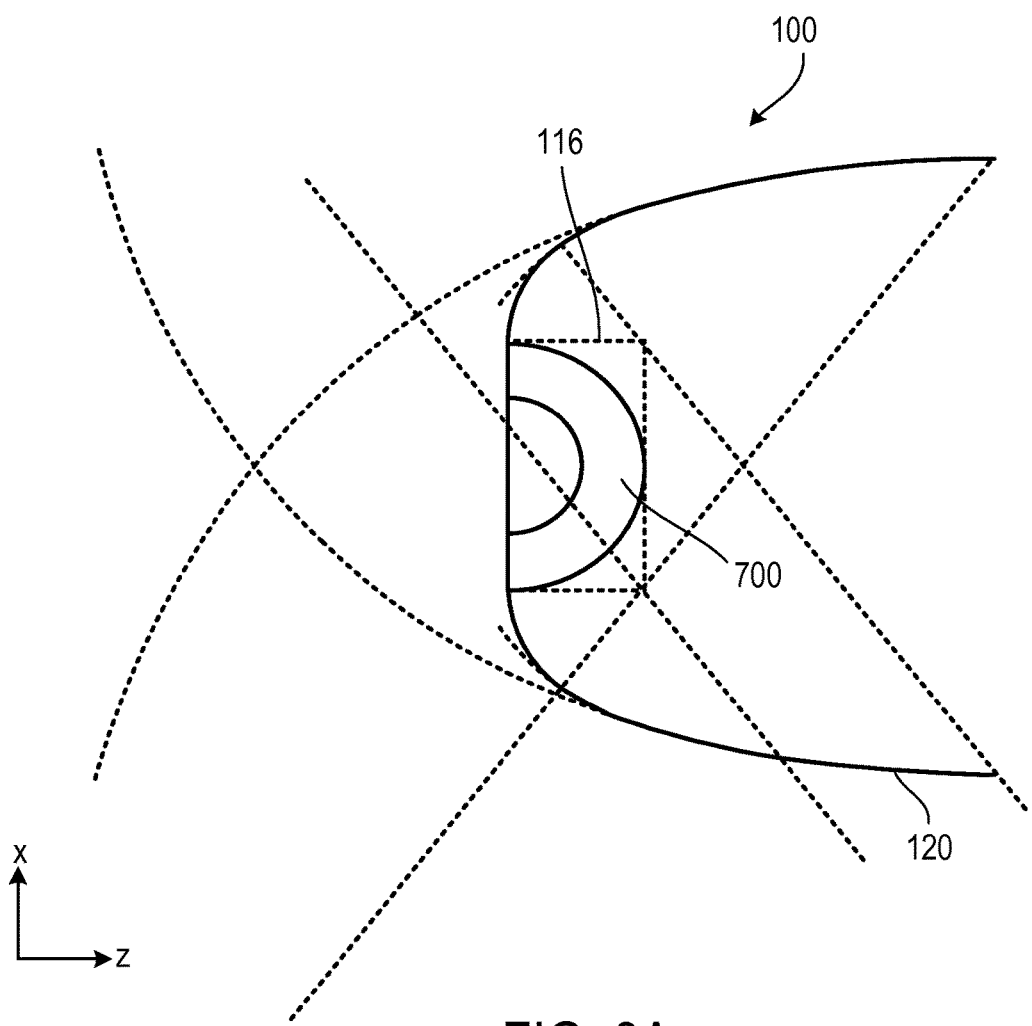
FIG. 8A shows a cross-sectional view of another embodiment of a luminaire module.
Figure 8B:
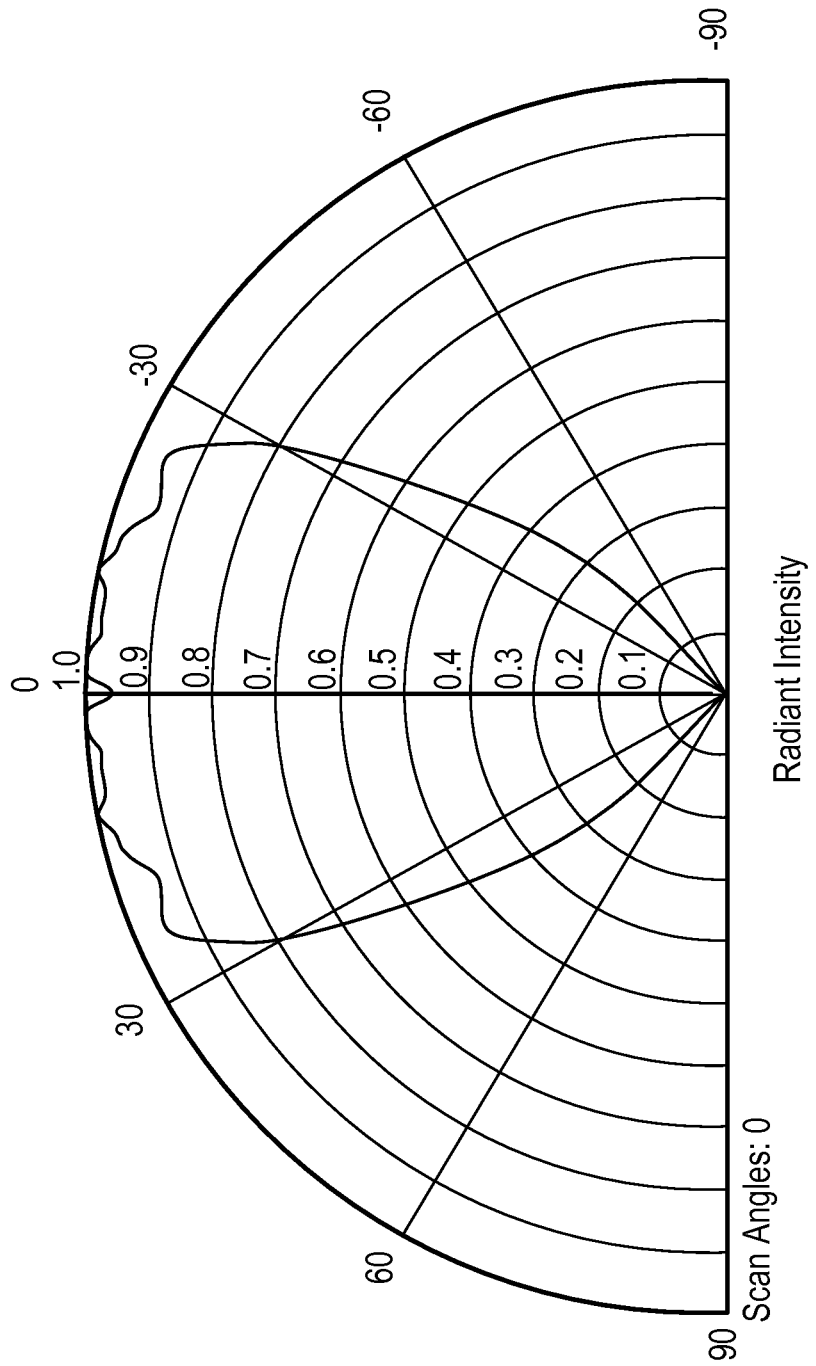
FIGS. 8B and 8C show plots of a light intensity distribution from the luminaire module shown in FIG. 8A.
Figure 8C:
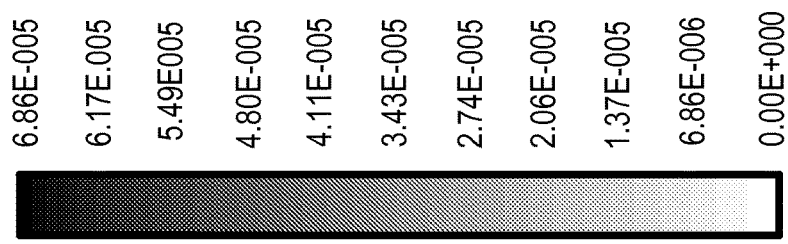
Figure 8C:
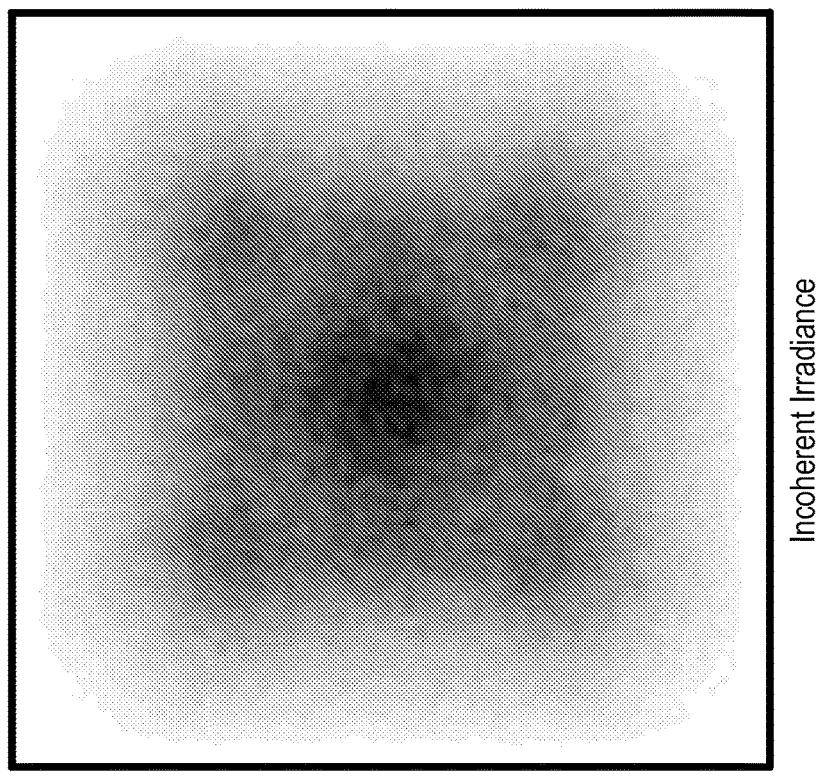

A simulated far field intensity distribution pattern for this example configuration is shown in FIGS. 8B and 8C. The reflector has a beam angle for the rectangular design envelope of 53° 8', but because the actual light emitting module is smaller than this design envelope, a smaller beam angle of about 45° is obtained with the light emitting module, and most of the beam intensity is within around 30°.

The far-field irradiance pattern shown in FIG. 8C shows a practical rectangular pattern (e.g., for rectilinear spaces, such as rectangular-shaped rooms), and the rotationally symmetrical case, is also a practical configuration.

Figure 9A:
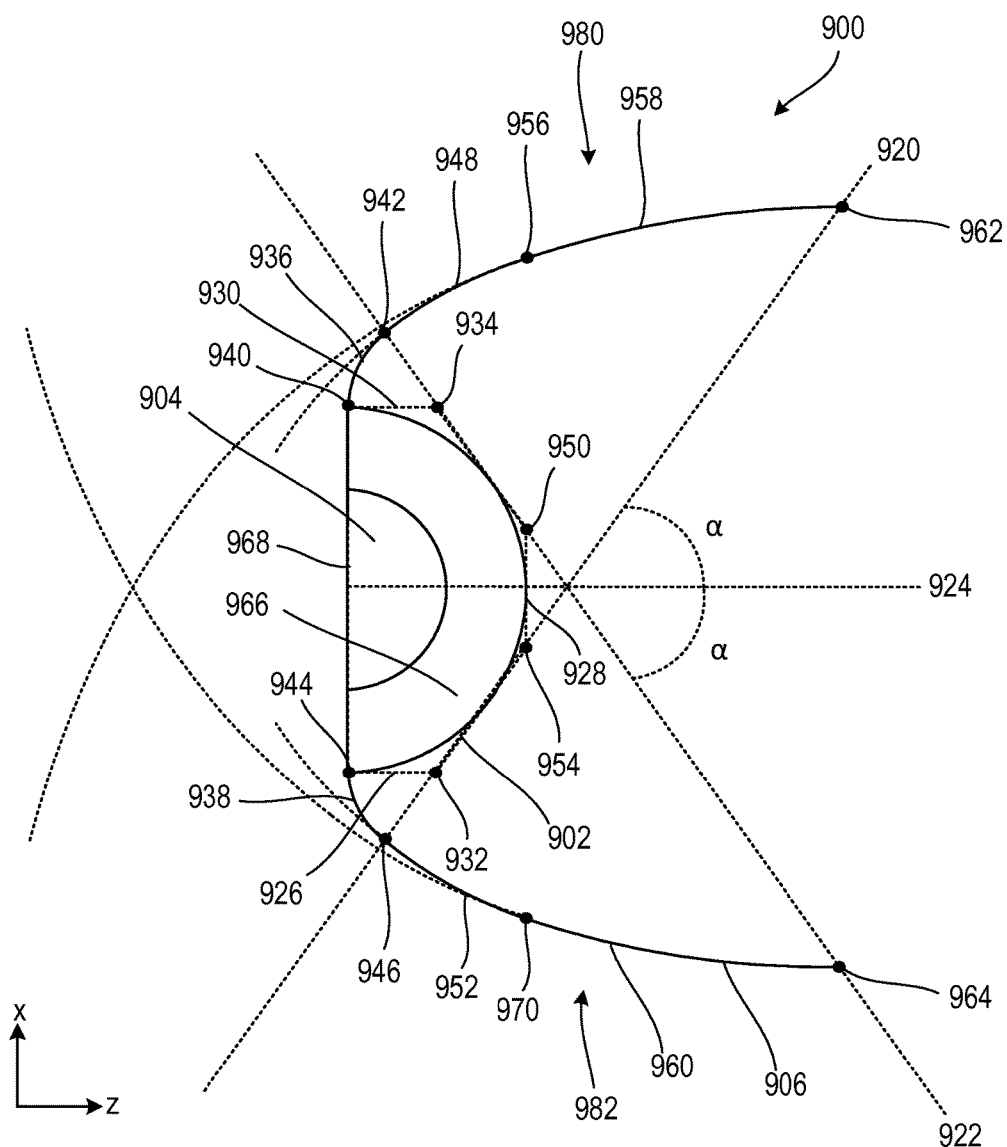
FIG. 9A shows a cross-sectional view of another embodiment of a luminaire module.

Thus far, design envelopes having rectangular cross-sections have been described. Design envelopes with other polygonal cross-sections can be used, and in some implementations, may be closer fits to the optimum shape for a light emitting module having a non-rectangular cross-section. (Note that the shape of the design envelope, in this specification, refers to the closed polygon defined by the design envelope.) For example, FIG. 9A illustrates an example cross-sectional relationship between a six-side half-octagonal envelope 902 and reflector 906 of a luminaire module 900. The reflector 906 includes side portions 980 and 982. The first side portion 980 refers to a portion of reflector 906 that includes segments 936, 948, and 958, which extend between pairs of points 940 and 942, 942 and 956, and 956 and 962, respectively. The second side portion 982 refers to a portion of reflector 906 that includes segments 938, 852, and 960, which extend between pairs of points 944 and 946, 946 and 970, and 970 and 964, respectively. Envelope 902 is formed by construction lines drawn sequentially through points 940, 934, 950, 954, 932, and 944. Also illustrated in FIG. 9A are several construction lines 920, 922, and 924, and solid circles used as points for boundaries between various sections of the profile of the reflector 906 to clarify the configuration.

For a light emitting module 904 having a light emitting portion 966, the six-sided half-octagon envelope 902 is much closer in perimeter to the semi-circular cross-section of light emitting portion 966 compared to that of a rectangular envelope (e.g., as illustrated in FIG. 1B), and can yield a more compact reflector than a reflector designed with a rectangular design envelope. As an example, with a light emitting module with a 10 mm radius hemi-dome, and 53° 8' beam angle α, the rectangular design envelope perimeter is 40 mm, versus 33.333 mm (100/3) for the half octagon design envelope. Since the beam angle is arcsin 0.8, these perimeters lead to a reflector aperture of 40/0.8=50.00 mm and 33.333/0.8=41.667 mm and 10×π/0.8=39.27 mm for the minimum reflector aperture. The half octagon reflector, which can be used at all beam angles, still requires only the three arc segments, of one circular arc, and two parabolic arcs. In some implementations, such an arrangement may be simpler to construct than a true hemisphere involute curve.

For the half octagon case, the design envelope 902 is enclosed by construction lines 920 and 922, which are each tangent to the semi-circular light emitting portion 966 at the beam angles α and intersect on the optical axis 824. Horizontal and vertical tangent line sections 926, 928, 930, and 968 complete the six-sided envelope 902. The horizontal tangents 926 and 930, and the beam angle tangents 920 and 922 define two vertices 932 and 934 of the design envelope 902. These two points 932 and 934 are the centers of curvature of the first circular arc sections 936 and 938, which span the angle from horizontal to the beam angle construction lines. Arc section 936 spans between points 940 and 942. Arc section 938 spans between points 944 and 946.

The focus of the first parabolic arc 948 is no longer the same as the center of the circle arc 936, but is the intersection of the beam angle construction line 922 with the vertical tangent to the hemisphere 928 at point 950, so the polar radius of the first parabolic arc 948 is much longer than twice the circle radius, which applies for the rectangular envelope. Another parabolic arc 952 mirrors 948, and has a focus of the intersection of the beam angle construction line 920 with the vertical tangent to the hemisphere 928 at point 954.

The arcs 936 and 948 are continuous and slope continuous at their junction at point 942 (i.e., on the beam angle construction line 922), and the parabolic arc 948 continues from point 942 to its meeting with the vertical tangent to the hemisphere 928 at point 956, where it connects to the second parabolic arc 958, also with slope continuity. Similarly, the arcs 938 and 952 are continuous and slope continuous at their junction at point 946 (i.e., on the limit construction line 920), and the parabolic arc 952 continues from point 946 to its meeting with the vertical tangent to the hemisphere 928 at point 970, where it connects to the second parabolic arc 960, also with slope continuity.

The focus of the second parabolic arc 958 is the same point as the lower intercept of the limit construction line 920 with the vertical line 928 at point 954, so the two sets of parabolic arcs (a) 948 and 958, and (b) 952 and 960, use a crossed pair of common foci.

For a 45° beam angle, the six sided perimeter figure is a half regular octagon shape, but for all other beam angles, the figure is symmetrical but irregular.

The second parabolic arc 958 continues from the point 956 until it meets the beam angle construction line 920 at point 962. Similarly, the parabolic arc 960 continuous from the point 970 until it meets the beam angle construction line 922 at point 964.

Figure 9B:
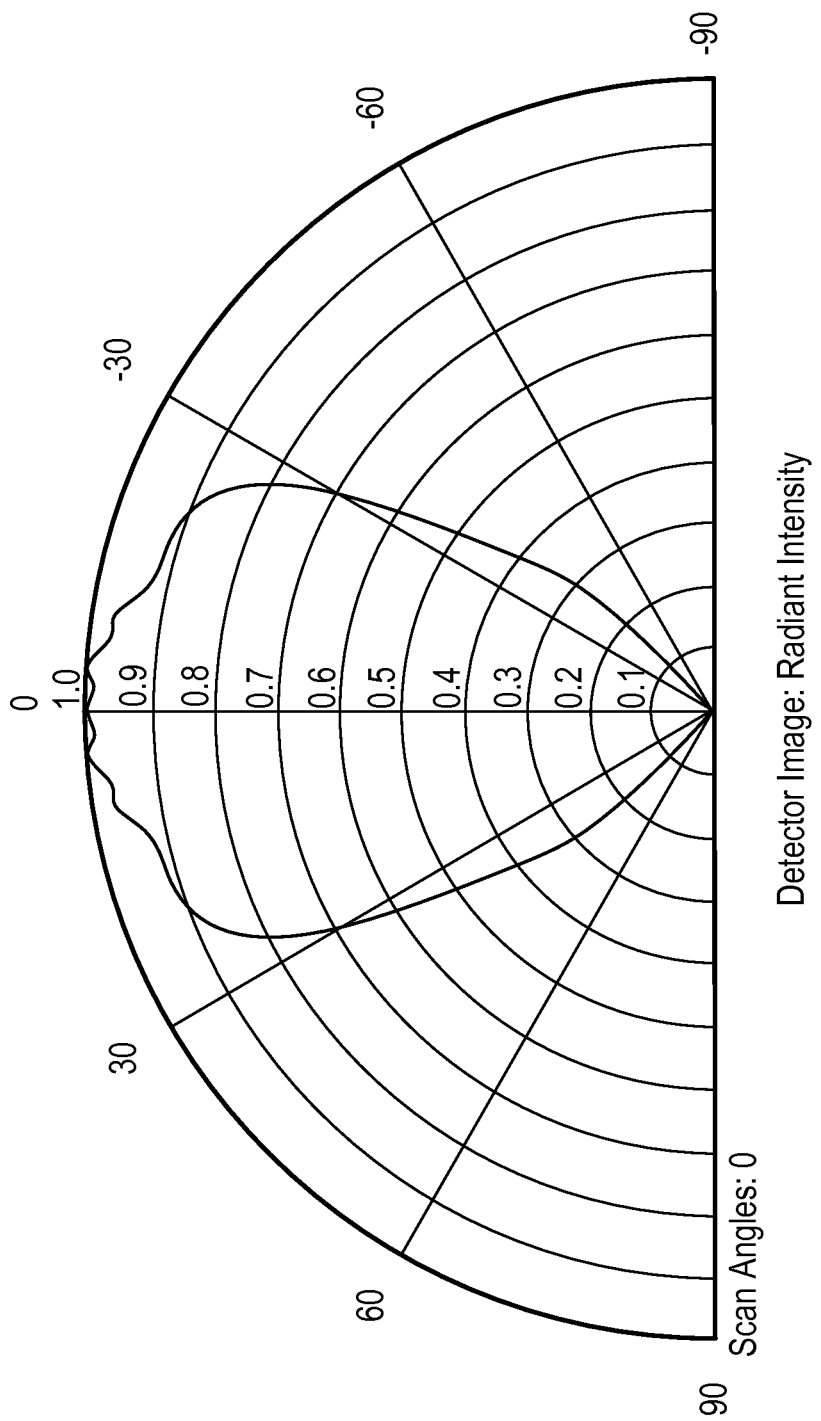
FIGS. 9B and 9C show plots of a light intensity distribution from the luminaire module shown in FIG. 9A.
Figure 9C:
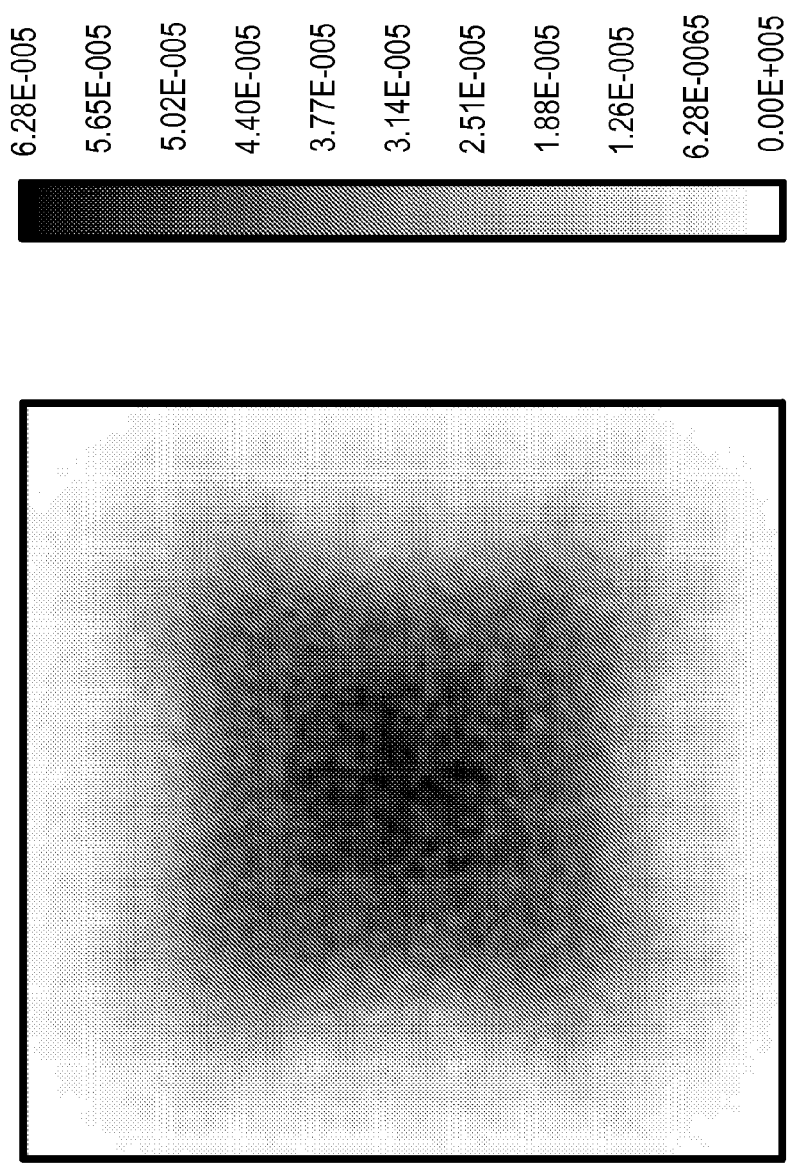

FIGS. 9B and 9C show an intensity distribution and far-field intensity pattern, respectively, for this example half-octagon envelope configuration. The intensity distribution shown in FIG. 9B, for example, shows better adherence to the designed beam angle and this form is more compact than the reflector designed in accordance with the design envelope shown in FIG. 8A. The far field irradiance patterns (compare FIG. 9C with FIG. 8C) are similar to each other.

The principle of selecting polygons having more and more sides to conform to the light emitting module can be extended such that the radius of curvature of the reflector varies continuously as the reflector approaches the light emitting module. Such reflectors are shaped so that, for each point in the segments nearest to the light emitting module, the surface normal to the reflector corresponds to the tangent at a corresponding point of the semi-circular light emitting module. This is referred to as an involute surface and it is believed this corresponds to the optimal shape for minimizing the size of the reflector while achieving the desired level of performance (i.e., delivering all light within the desired beam angle without reflecting light back into the light emitting module).

Figure 10A:
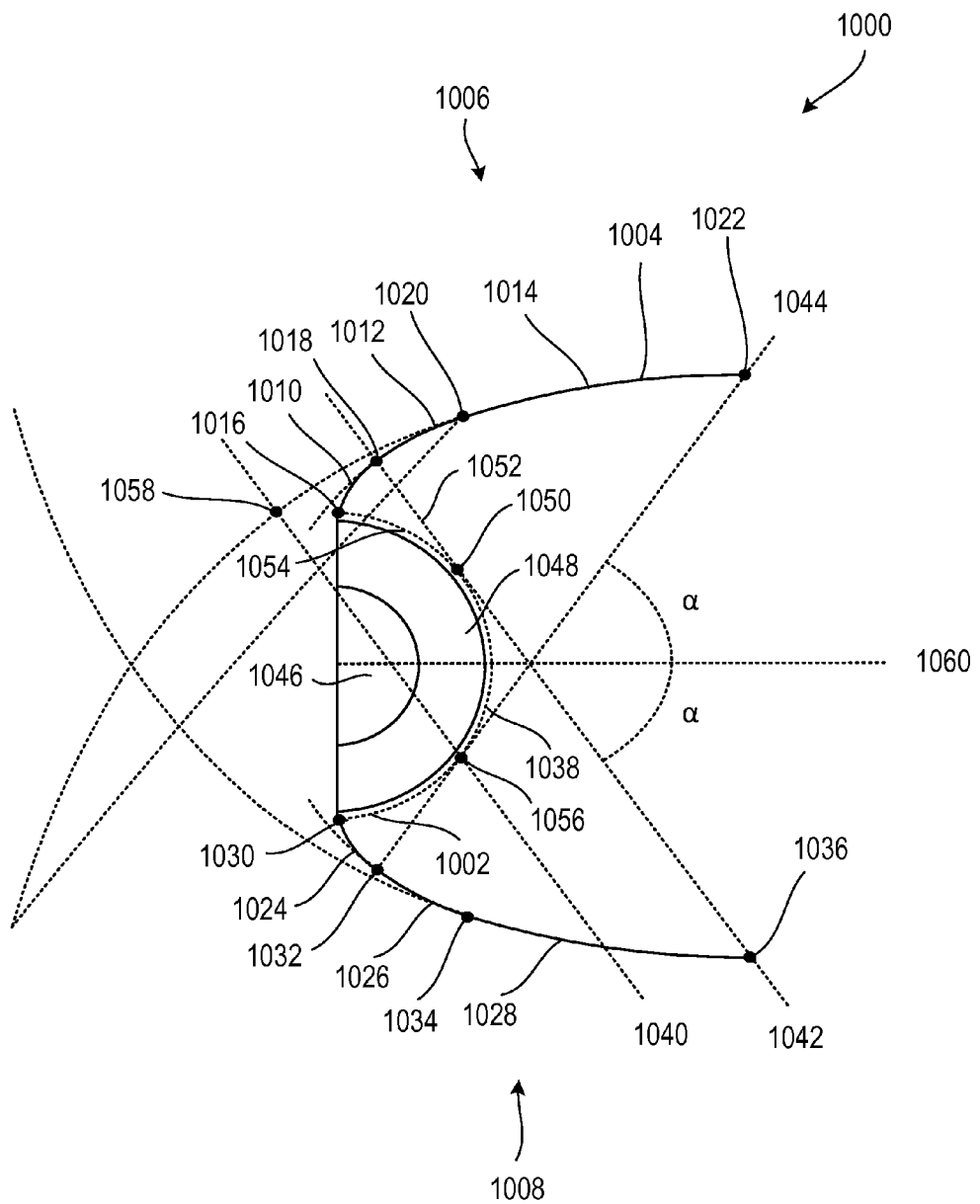
FIG. 10A shows a cross-sectional view of another embodiment of a luminaire module.

For example, FIG. 10A illustrates an example cross-sectional relationship between a semicircular envelope 1002 and an involute-based reflector 1004 of a luminaire module 1000. The reflector 1004 includes side portions 1006 and 1008. The first side portion 1006 refers to a portion of reflector 1004 that includes segments 1010, 1012, and 1014, which extend between pairs of points 1016 and 1018, 1018 and 1020, and 1020 and 1022, respectively. The second side portion 1008 refers to a portion of reflector 1004 that includes segments 1024, 1026, and 1028, which extend between pairs of points 1030 and 1032, 1032 and 1034, and 1034 and 1036, respectively. Envelope 1002 is formed by the outline of a notional semicircle 1038, drawn along the periphery of light emitting module 1046. Also illustrated in FIG. 10A are several construction lines 1040, 1042, and 1044, and solid circles used as points for boundaries between various sections of the profile of the reflector 1004 to clarify the configuration.

For a light emitting module 1046 having a light emitting portion 1048, the semi-circular envelope 1002 is even closer in perimeter to the semi-circular cross-section of light emitting portion 1048 compared to that of a rectangular envelope (e.g., as illustrated in FIGS. 1B and 8A) or that of a six-sided half-octagon envelope (e.g., as illustrated in FIG. 9A), and can yield a more compact reflector than a reflector designed with either a rectangular or half-octagon design envelope. As an example, for a light emitting module with a 10 mm radius hemi-dome, and 53° 8' beam angle $\alpha$, and the perimeter of the minimum reflector aperture is $\pi \times R = 31.416$ mm, where R is the radius of the semi-circle. Each portion of the involute reflector, which can be used for a range of beam angles, still utilizes only the three arc segments, of one involute arc, and two parabolic arcs. Construction line 1042 is tangent to the envelope 1002 at the point 1050, and inclined to the axis 1060, at the design beam limit angle $\alpha$.

In the previous example rectangular and half-octagon envelope constructions, the first arc of each (i.e., 124a of FIG. 1B or 936 of FIG. 9A) was represented as a constant radius circular arc. This constant radius circular arc can also be represented as the involute of a straight side of the design envelope (i.e., the side between points 192 and 180a of FIG. 1B or side 930 of FIG. 9A), with a constant center point (i.e., point 192 of FIG. 1B or point 934 of FIG. 9A). In this example, segment 1010 is an involute arc with a curved arc length 1054 (i.e., the arc between points 1050 and 1016). The involute arc segment 1010 is obtained as if unrolling a taut string pinned at point 1050, from the starting point at the point 1016 on the design envelope 1002. Thus, the segment 1052 (i.e., the distance between points 1050 and 1018) is exactly equal to the curved arc length 1054. Segment 1010 terminates at the point 1018 after rotating through the beam angle $\alpha$. In this example, the beam angle $\alpha$ is arcsin (0.8).

Segment 1012 is a parabolic arc, and has a focus at point 1050 and a pole at point 1018. Thus, the length of segment 1052 equals the focal length of the segment 1012. Segment 1012 proceeds from the pole at point 1018 to the point 1020, where the parabola of segment 1012 has the same z-axis value as the focal point 1050, after the radial vector has rotated through an angle $\phi$. In this example, the angle $\phi$ is arcsin (0.6). Thus, the point 1020 can be computed based on a parabola with a focal length equal to the length of segment 1052.

Figure 10B:
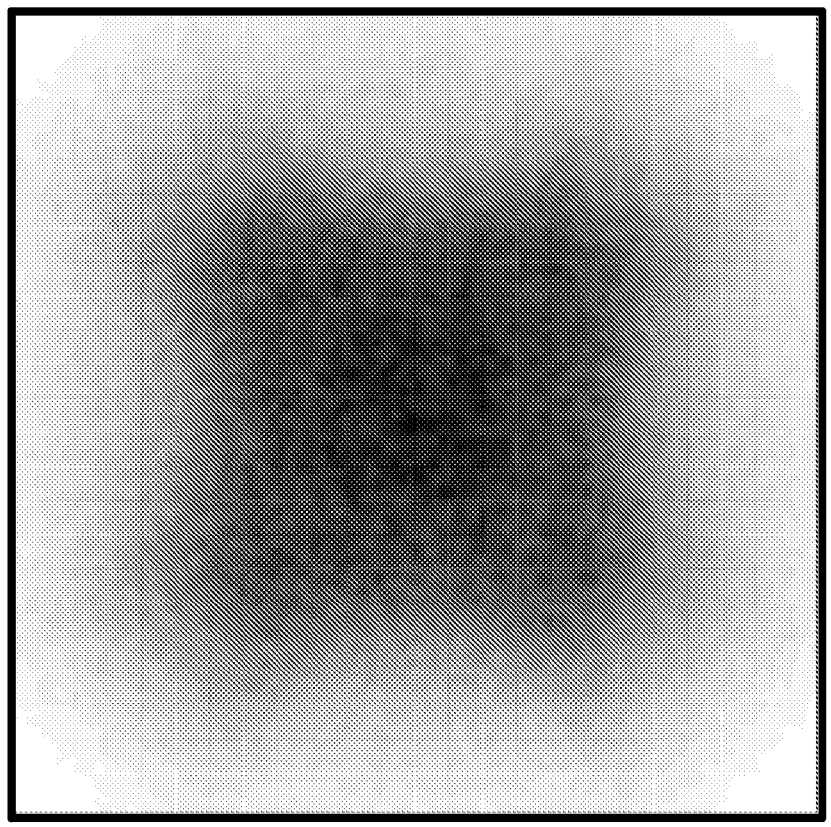
FIG. 10B shows a plot of a light intensity distribution from the luminaire module show in FIG. 10A.

Segment 1014 is also a parabolic arc, and starts at the point 1020 and continues to the end point 1022. The focal point of parabolic segment 1014 is point 1056, and focal length is the distance between points 1056 and 1020. Construction line 1040 and point 1058 are the axis and the pole of the parabolic segment 1014, respectively. Parabolic segment 1014 is back-rotated through the angle $\phi$ in order to match the beam angle $\alpha$. The tangent to design envelope 1002 at point 1056 is the construction line 1044, which meets the segment 1014 at the end point 1022. The radial length of the construction line between points 1056 and 1022 can be computed based on a parabolic having a focal length equal to the distance between points 1056 and 1020, and the total rotation angle of $2\phi$ from direction of construction line 1040 to the construction line 1044. Thus, the radial aperture of the point 1022 is equal to the length of arc 1054 of the design envelope 1002 plus the x-dimensional distance between axis 1060 and point 1050, divided by the sine of the beam angle $\alpha$ FIG. 10B and shows an intensity distribution for this example semi-circle envelope configuration. The intensity distribution shown in FIG. 10B, for example, shows better adherence to the designed beam angle and this form is more compact than the reflector designed in accordance with the design envelope shown in FIGS. 8A and 9A.

In some implementations, an involute-based reflector (for example, as illustrated in FIG. 10A), can be designed in the above manner, based on a design envelope having a truncated semicircle cross-section. For example, in some implementations, an involute-based reflector can be designed based on a design envelope similar to design envelope 1002, but having a flat portion between points 1050 and 1056. The region between points 1050 and 1056 can be occupied by a concave dished surface, a flat surface, or a convex surface that remains entirely within the two construction lines 1042 and 1044 and is even with respect to a line drawn between points 1050 and 1056, without deviating from the design principles described above.

Accordingly, these reflector forms may provide versatile platforms for use with different LED-based light emitting modules; from ASLVs to rectangular or even cylindrical (axial) forms. FIGS. 11A-11C show exemplary form factors for various light emitting modules. Each figure shows, schematically, the footprint of light emitting modules (i.e., in the x-y plane for the Cartesian coordinate system shown in FIGS. 1A-1B, above). For example, referring to FIG. 11A, a light emitting module 1100 can have a rectangular footprint 1106. For instance, light emitting module 1100 can include a slab-shaped leaky light guide having a rectangular footprint, or it can be a rectangular array of LEEs. In some embodiments, a light emitting module 1100a has a circular footprint 1102. Examples include hemi-domes such as those described in relation to FIGS. 7A-7C above. Hemi-ellipsoids are also possible. Referring to FIG. 11C, a light emitting module having a square footprint 1104 is also possible. For example, a cuboid as described in relation to FIG. 6 above can have a square footprint. In each example, light flux is illustrated by arrows 1112.

Furthermore, reflectors can be designed based on a single design envelope selected based on a single cross-sectional profile of the light emitting module. Alternatively, in some embodiments, reflectors can be designed based on multiple design envelopes, such that the shape of the reflector changes for different cross-sectional profiles through the reflector.

The reflector profiles can be used in square/rectangular crossed trough configurations or in rotationally axi-symmetric forms, for example. For use with formed Alanod sheet mirrors, roughly rotational forms can be made from octagonal or higher polygonal shapes; with increasing manufacturing complexity, with number of sides.

In some implementations, rotationally symmetrical reflectors can be used by the luminaire modules in conjunction with, e.g., 4-sided or tubular rod sources. In other implementations, cylindrical troughs, with or without cellular end mirrors (in the plane of the page) and crossed troughs, can be used by the luminaire modules, in conjunction with rod-shaped extended light sources of, or by a luminaire module in conjunction with flat-shaped extended light sources.

In some embodiments, a luminaire module can reflect light from an extended light source with the reflector in such a way that a target surface is as uniformly lit as possible. That is, hot spots and dead spots can be minimized through suitable configuration of the reflective properties (of the reflective surface) of the reflector. For this purpose, it may be useful to configure the reflector so that it is also as uniformly lit as possible. This may facilitate designing the luminaire module according to nonimaging optical principles in creating the reflection in the reflector.

Figure 12:
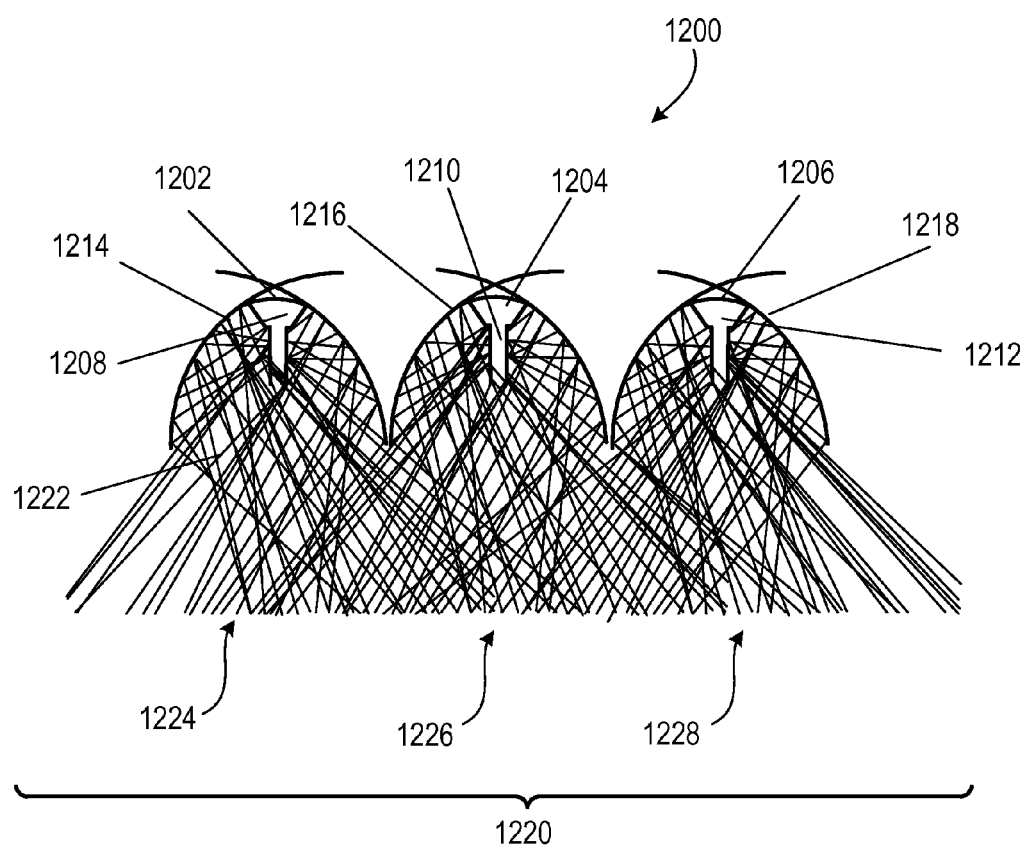
FIG. 12 shows an embodiment of an array of luminaire modules.

In some embodiments, luminaires may be composed using multiple luminaire modules. For instance, FIG. 12 shows a cross-section of an example luminaire module array 1200 that includes individual luminaire modules 1202, 1204, and 1206. In the example illustrated in FIG. 12, the individual luminaire modules 1202, 1204, and 1206 are identical; however this need not be the case. The luminaire modules 1202, 1204, and 1206 each include a light emitting module 1208, 1210, and 1212, respectively, each configured as a spatially-extended light source. FIG. 12 also shows representations of several rays of light 1222 output by each of the light emitting modules 1208, 1210, and 1212. Reflectors 1214, 1216, and 1218 may be rotationally symmetric, square, elliptical, or have non-analytic surfaces. A light flux 1220 output by the luminaire module array 1200 is a superposition of light flux 1224 output by the device 1202 and corresponding light fluxes 1226 and 1228 output by the other devices 1204 and 1206.

Figure 13A:
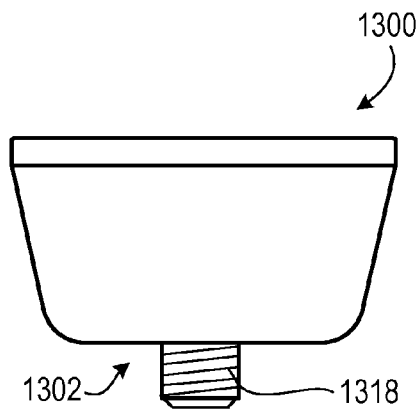
FIGS. 13A-B show an embodiment of a luminaire module with a single light emitting portion.
Figure 13B:
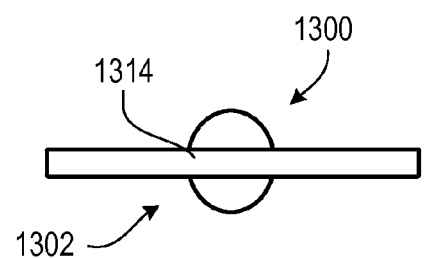

In some implementations, a luminaire module can include one or more light emitting modules and/or one or more light emitting portions, and a single reflector. For example, FIGS. 13A and 13B show respective side and plan views of an example implementation of a recessed can luminaire module 1300 that includes a light emitting module 1302 with a single light emitting portion 1314, which extends across the diameter of the luminaire module 1300. Light emitting portion 1314 has a rectangular footprint, as shown in FIG. 13B. In some embodiments, light emitting module 1302 is an example of a module that includes a leaky light guide. Luminaire module 1300 also includes a base 1318 which connects the luminaire module 1300 to a light socket.

Figure 13C:
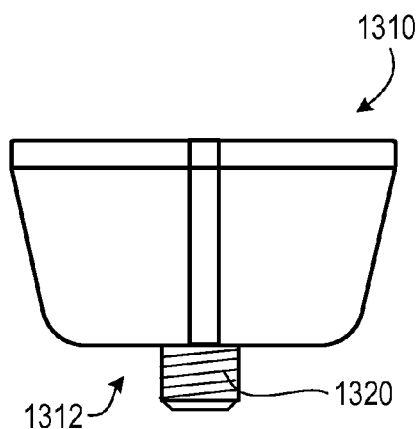
FIGS. 13C-D show an embodiment of a luminaire module with multiple light emitting portions.
Figure 13D:
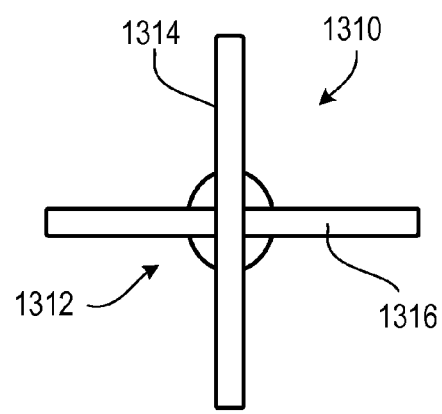

FIGS. 13C and 13D show respective side and plan views of another example implementation of a recessed can luminaire module 1310 that includes a light emitting module 1312 with two light orthogonal light emitting portions 1314 and 1316, mounted on a base 1320.

The luminaire modules 1300 and 1310 can be used as a replacement bulb in existing recessed cans (e.g., being compatible with an Edison mount). In some implementations, the luminaire module includes an LED and an aluminum heat sink. In some implementations, the LEE and heat sink are opposite the Edison base, thus pulled away from the hottest part of the can (which is often the apex when installed and may be a heat trap for LED-based can replacements), such as illustrated in FIGS. 5A-5D. The power supply unit can be in the Edison base, as in other LED replacement bulbs. In these embodiments, the light emitting modules also can be enclosed in a notional design envelope, such that all of its light emitting surfaces are contained within the notional envelope. A reflector can be designed based on the dimension of the design envelope, as described above, with respect to one or more cross-sections. For instance, a reflector can be designed based on a single cross-section of the design envelope, two cross-sections (e.g., two cross-sections made with respect to orthogonal planes, or two cross-sections made with respect to oblique planes), or more than two cross-sections.

In some implementations, the recessed can luminaire module provides efficient illumination in a prescribed radiation pattern with uniform luminance and maintains a thermally advantageous configuration. Such advantageous thermal configuration may be accomplished through positioning a heat sink bar (e.g., made from aluminum) coupled to a vertical leaky light guide with LEDs that are disposed at an end thereof that is proximate, or external/flush with the optical exit plane of the can (as opposed to placing the LEDs at the top of the can, where heat collects). In addition, the recessed can LED luminaire module utilizes a compound parabolic/circular reflector in the can and the vertical light guide as the spatially-extended light source.

The recessed can LED luminaire module couples light flux from LEDs by chip-on-board (COB) or prepackaged via CPC array to short light guide. The short light guide creates a uniform area source. The LED array is positioned within an aluminum heat sink with fins configured to transfer heat via convection. The uniform area source is oriented with the aluminum heat sink flush with the optical exit plane, instead of up in the can. The can has a reflector with translated and rotated parabolic and circular section. The parabolic focus is disposed on the furthest luminous section of the light guide (in accordance with the edge ray principle), and the parabolic section is rotated to the design cut-off angle for the radiation pattern. Optionally, the light guide can be field replaceable.

A number of embodiments have been described. Nevertheless, it will be understood that various modifications may be made without departing from the spirit and scope of the invention. For example, while the foregoing embodiments feature specularly reflective reflectors, more generally, other reflectors may also be used. For example, in some embodiments, the reflector may be formed from a diffusely reflecting or partially-diffusely reflecting material.

Also, other forms of light emitting modules are also contemplated. For example, in some implementations, a flat-shaped extended light source can be a light sheet fabricated as described in commonly-owned patent application U.S. 2011/0193114. In this case, a plurality of LEDs can be distributed over the opposite light emitting surfaces of the light sheet (i.e., extended light source). For example, the LEDs can be distributed in accordance with different emission wavelengths to obtain specified color patterns. In this manner, a given combination of the reflector's geometry (e.g., θ, R, etc.) and the light sheet's color distribution can be used to fabricate a luminaire module that outputs a specified illumination pattern and chromaticity thereof.

In some embodiments, luminaire modules can include additional components. For example, reflector optics can be combined with controlled scattering surfaces at the output aperture, for example, in the form of sealing windows, to smooth out discontinuities caused, e.g., by the distributed nature of the LED array sources. Such windows can also provide at least partial protection of the luminaire modules from weather and other environmental influences.

Accordingly, other embodiments are within the scope of the following claims.

What is claimed is:

1. An apparatus, comprising:
a light-emitting module having a light-emitting portion with a circular-arc shaped cross-section; and
a reflector having a reflective surface which, in cross-section, comprises a first portion and a second portion extending from opposing sides of the light-emitting module in a first direction and in a second direction orthogonal to the first direction, the reflective surface being positioned to receive light from the light-emitting module and configured so that the reflector and light-emitting module provide light having a light distribution which, in cross-section, extends from an angle α to −α about an axis parallel to the first direction,
wherein, in cross-section, the first and second portions of the reflective surface each comprise a plurality of segments, each segment having a curvature based on a notional envelope circumscribing the circular-arc shaped cross-section, and the curvature of each segment is such that light from the light-emitting module incident on the reflective surface exits the apparatus after a single reflection from the reflective surface, and
wherein the first and second portions each comprise a first segment closest to the light-emitting module, wherein, in cross-section, the first segments are shaped as respective involutes of the envelope.

2. The apparatus of claim 1, wherein, in cross-section, the first and second portions are concave.

3. The apparatus of claim 1, wherein, in cross-section, a slope of the reflective surface is continuous across the segments of the first and second portions, respectively.

4. The apparatus of claim 3, wherein the first and second portions each comprise a second segment adjacent the respective first segments, wherein a normal to the reflective surface at a point where the first and second segments meet intersects the axis at the angle α or −α.

5. The apparatus of claim 4, wherein the first portion of the reflective surface extends to a point coinciding with the normal to the second portion of the reflective surface where the first and second segments of the second portion meet, and
the second portion of the reflective surface extends to a point coinciding with the normal to the first portion of the reflective surface where the first and second segments of the first portion meet.

6. The apparatus of claim 3, wherein each of the second segments form an arc of a first parabola and the normal to the reflective surface at the point where the respective first and second segments meet intersects the envelope in one point being the focal point of the first parabola.

7. The apparatus of claim 6, wherein each of the first and second portions comprises a third segment forming an arc of a second parabola having a focal point corresponding to the focal point of the first parabola of the other of the first and second portions.

8. The apparatus of claim 1, wherein the reflective surface is rotationally symmetric about the axis.

9. The apparatus of claim 1, wherein the reflective surface has translational symmetry in a direction orthogonal to the first and second directions.

10. The apparatus of claim 1, wherein the envelope coincides with the circular-arc shaped portion.

11. The apparatus of claim 1 is a luminaire.

* * * * *

UNITED STATES PATENT AND TRADEMARK OFFICE
CERTIFICATE OF CORRECTION

| | |
|---|---|
| PATENT NO. | : 9,822,948 B2 |
| APPLICATION NO. | : 14/428147 |
| DATED | : November 21, 2017 |
| INVENTOR(S) | : George E. Smith et al. |

Page 1 of 1

It is certified that error appears in the above-identified patent and that said Letters Patent is hereby corrected as shown below:

In the Claims

Column 22, Line 40, in Claim 6, delete "claim 3" and insert -- claim 4 -- therefor.

Signed and Sealed this
Twenty-ninth Day of May, 2018

Andrei Iancu
*Director of the United States Patent and Trademark Office*